United States Patent [19]

Watanabe et al.

[11] Patent Number: 4,888,602
[45] Date of Patent: Dec. 19, 1989

[54] RECORDING APPARATUS WITH BIPOSITIONAL SHEET GUIDING MEMBER

[75] Inventors: Yoshitaka Watanabe, Tokyo; Yoshiyuki Mizoguchi, Yokohama; Hiroyuki Hiraga, Tokyo, all of Japan

[73] Assignee: Canon Kabushiki Kaisha, Tokyo, Japan

[21] Appl. No.: 136,734

[22] Filed: Dec. 22, 1987

[30] Foreign Application Priority Data

Dec. 25, 1986 [JP] Japan .................................. 61-307901
Dec. 25, 1986 [JP] Japan .................................. 61-307908
Dec. 25, 1986 [JP] Japan .................................. 61-307909
Dec. 25, 1986 [JP] Japan .................................. 61-307912

[51] Int. Cl.$^4$ ............................................. G01D 5/24
[52] U.S. Cl. ........................................ 346/134; 271/4; 400/595
[58] Field of Search ................ 346/134; 400/595, 596, 400/642, 643, 645.3, 645.4, 665.5; 271/4

[56] References Cited

U.S. PATENT DOCUMENTS 4,489,931 12/1984 Costa et al. .............................. 271/4
4,698,650 10/1987 Watanabe et al. ................... 346/134
4,699,366 10/1987 Kashimura et al. ..................... 271/4
4,727,437 2/1988 Mizoguchi ........................... 346/136

Primary Examiner—E. A. Goldberg
Assistant Examiner—Huan Tran
Attorney, Agent, or Firm—Fitzpatrick, Cella, Harper & Scinto

[57] ABSTRACT

A recording apparatus for recording on a sheet with a recording device includes a sheet conveying device, a bipositional sheet guiding member and independently operable driving mechanisms for the sheet conveying device and the bipositional sheet guiding member, so that a sheet is properly fed to a recording position when the sheet guiding member is in one position, and the sheet is properly guided during recording when the guiding member is in another position.

10 Claims, 26 Drawing Sheets

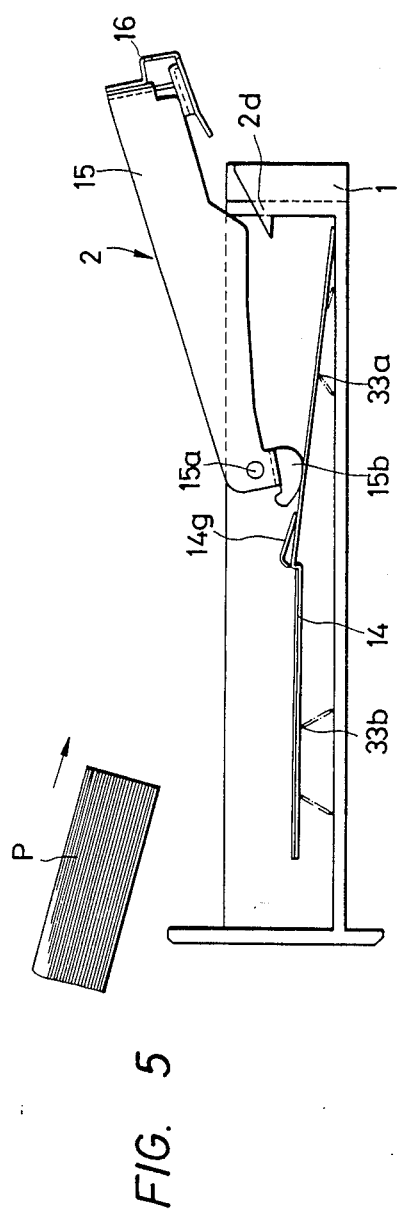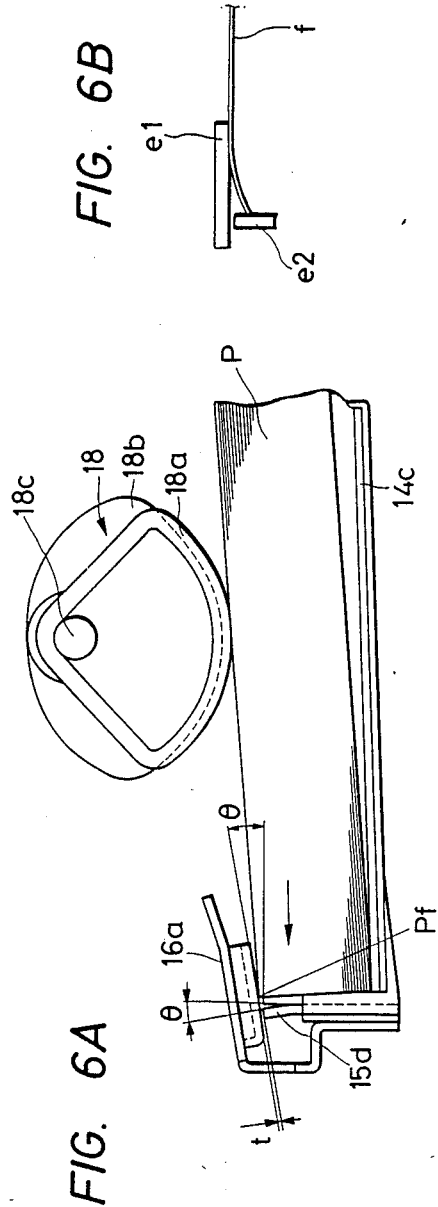

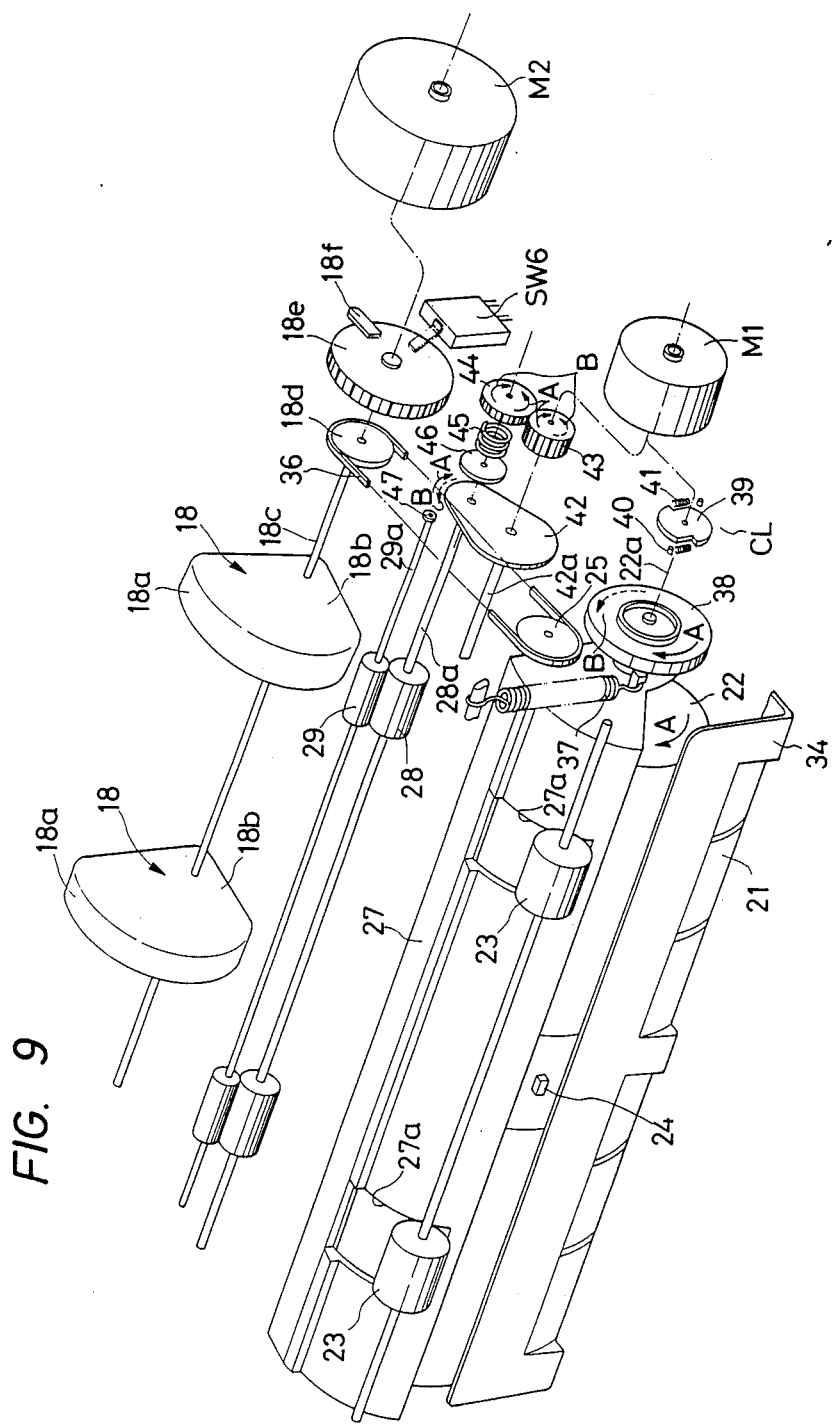

RECORDING APPARATUS WITH BIPOSITIONAL SHEET GUIDING MEMBER

BACKGROUND OF THE INVENTION

1. Field of the Invention

The present invention relates to a recording apparatus comprising a feeder for sheets to be printed and, more particularly, to a recording apparatus comprising an automatic feeder using cut sheets.

2. Prior Art

Conventionally, a method for separately feeding recording sheets such as paper from a paper feed cassette to a paper feed roller such as a platen roller one by one to perform printing has many advantages in terms of operability, low cost, and compactness of a machine, and a large number of proposals have been made.

However, in such a conventional recording apparatus, a length along a width of paper sheet, i.e., a direction perpendicular to a paper feed direction must be limited to a constant value. Such a limitation is necessary for winding a paper sheet around a platen roller without floating therefrom. Thus, a structure of a machine is complicated, and becomes bulky.

In another conventional apparatus, when a paper sheet is wound around a platen roller, a pinch roller which is urged against the platen roller is manually or automatically caused to escape from the platen roller to allow paper winding. However, even if such a structure is adopted, it is difficult to perfectly wind a paper sheet around the platen roller. After the winding operation, a correction operation must be performed.

After the winding operation, a paper sheet tends to be damaged or skewed due to a shock generated when the pinch roller is again urged against the platen roller. In addition, the mechanism and its control operation are complicated.

In particular, this tendency noticeably appears when an urging force of the pinch roller against the platen roller is increased in order to improve printing precision.

SUMMARY OF THE INVENTION

It is an object of the present invention to provide a recording apparatus capable of reliably guiding a sheet to a printing position and reliably guiding the sheet subjected to printing to be discharged from the printing position.

It is another object of the present invention to provide a recording apparatus capable of reliably guiding a sheet to a printing position, reliably guiding the sheet subjected to printing to be discharged from the printing position, and simplifying the guiding mechanism.

It is still another object of the present invention to provide a recording apparatus capable of automatically, stably and reliably feeding a sheet during both a sheet feed operation and a printing operation without damaging and skewing the sheet.

It is still another object of the present invention to provide a recording apparatus having high precision and operability and capable of reliably guiding a sheet to a printing position and reliably guiding the sheet subjected to printing to be discharged from the printing position.

In accordance with these and other objects of the present invention, a recording apparatus comprises recording means for recording on a sheet at a recording position, sheet conveying means for conveying the sheet to the recording position, first driving means for driving the sheet conveying means, a sheet guiding member for guiding the sheet, the sheet guiding member being displaceable between a first position and a second position different from the first position, and second driving means for driving the sheet guiding member between the first position and the second position independently of the operation of the sheet conveying means.

The above and other objects, advantages, and features of the present invention will be apparent from the following description taken in conjunction with the accompanying drawings.

BRIEF DESCRIPTION OF THE DRAWINGS

FIG. 5 is a side sectional view showing a state wherein a separation lever is pivoted to allow a bundle of sheets to be mounted;

FIG. 6A is a side sectional view showing a mounting state of a separation section and a separation plate;

FIG. 6B is a side sectional view showing a conventional state wherein a sheet which is curled downward is not separated from the horizontal separation plate;

FIG. 9 is a perspective view showing a structure of a paper feed system;

DETAILED DESCRIPTION OF THE PREFERRED EMBODIMENTS

A printer apparatus according to an embodiment of the present invention will be described in detail with reference to the accompanying drawings.

(Outer Appearance)

Figure 1:
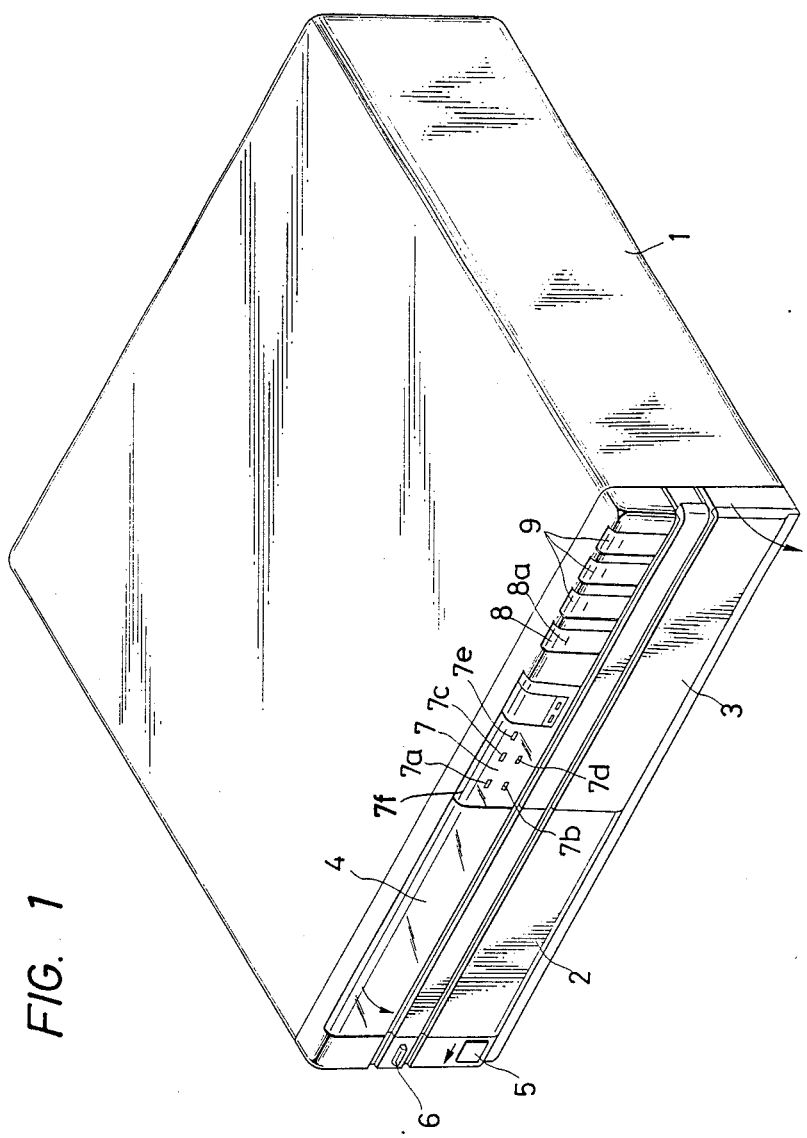
FIG. 1 is a perspective view showing an outer appearance of a printer apparatus.
Figure 2:
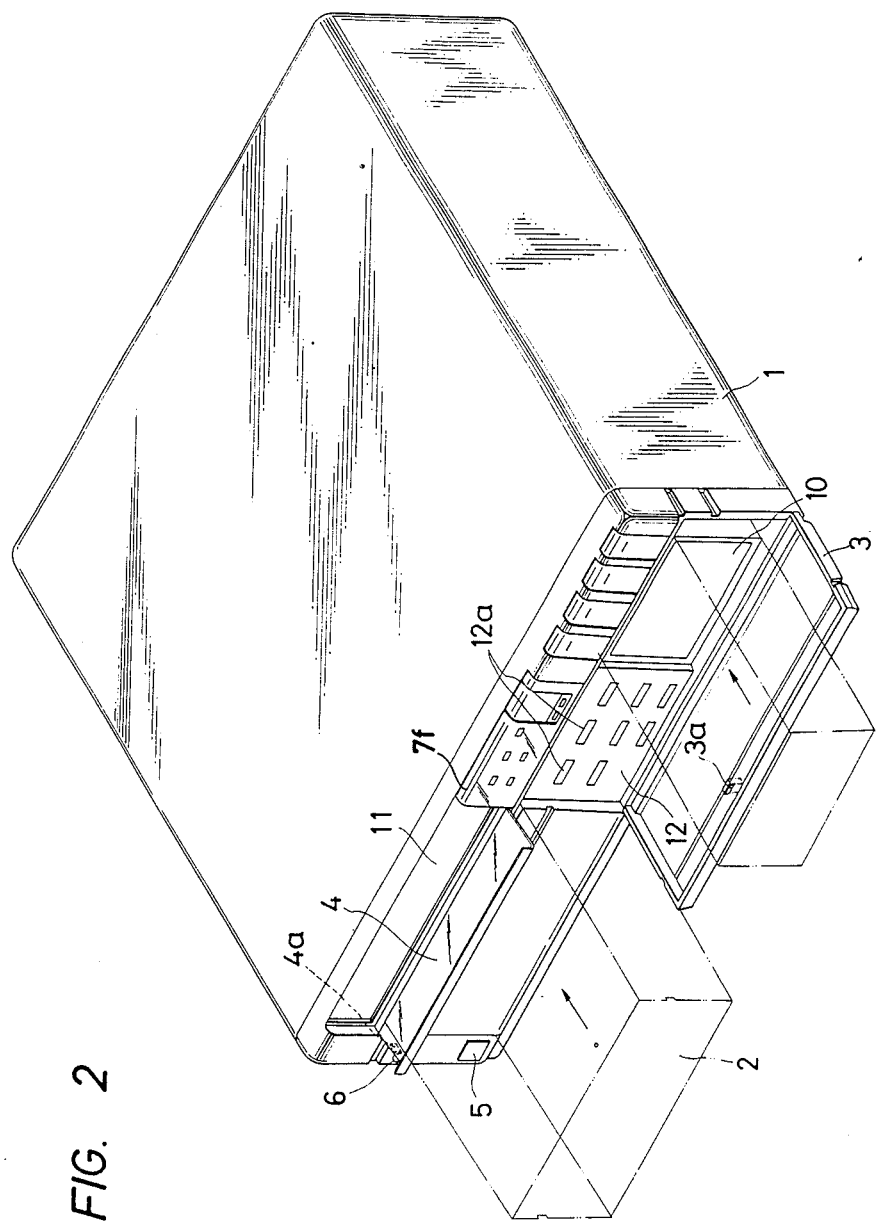
FIG. 2 is a perspective view showing the printer apparatus shown in FIG. 1 in a state wherein a dressing lid and a dust cover are open.

FIGS. 1 and 2 show the outer appearance of a printer body 1 of the printer apparatus. A small-sized cassette 2 is detachably loaded in a front surface of the printer body 1. A dressing lid 3 is pivotally mounted on the front surface of the printer body 1 to be adjacent to the right side of the cassette 2. In an open state of the dressing lid 3, as shown in FIG. 2, an ink cartridge 10, a sub-operation switch unit 12, and the like are exposed. The dressing lid 3 is locked in a closed state by a pawl 3a thereof, and a notch portion (not shown) formed in the printer body 1. When the dressing lid 3 is lightly pushed in a direction indicated by an arrow in FIG. 2, the lock is disengaged, and an open state shown in FIG. 2 is obtained.

A dust cover 4 for a paper feed port 11 is pivotally mounted on the front surface of the printer body 1 to be adjacent above the cassette 2. The dust cover 4 has a pawl 4a, and can be opened/closed in the same manner as in the dressing lid 3. A dust cover switch SW1 (to be described later) is attached to the dust cover 4, thus detecting an open/closed state of the dust cover 4.

A knob 5 for loading/unloading the cassette 2 is disposed adjacent to the left side of the cassette 2. The knob 5 will be described later in detail. A power switch 6 is disposed above the knob 5.

An indicator unit 7 is arranged above the left side of the dressing lid 3. The indicator unit 7 has an indicator 7a for indicating an abnormality of a paper feed system, an indicator 7b for indicating an abnormality of an ink supply system, an indicator 7c for indicating a printing position A, an indicator 7d for indicating a printing position B, and an indicator 7e for indicating a printing position C, all of which are covered by a dust cover 7f.

Main operation switches 8 and 9 are disposed above the right side of the dressing lid 3. The main operation switch 8 serves as a printer switch, and is provided with an LED 8a indicating that a printing switch is operated. The main operation switch 9 is not related to the present invention, and a detailed description thereof will be omitted.

The ink cartridge 10 is pushed in a direction indicated by an arrow, and is then coupled to an ink-jet head IJU through a known needle. The ink cartridge 10 can be detached by a lever to be described later. As shown in FIG. 2, the sub-operation switch unit 12 comprises a switch 12a for selecting the printing position, and other switches of the unit 12 are not related to the present invention and a detailed description thereof will be omitted.

(Internal Layout)

Figure 3:
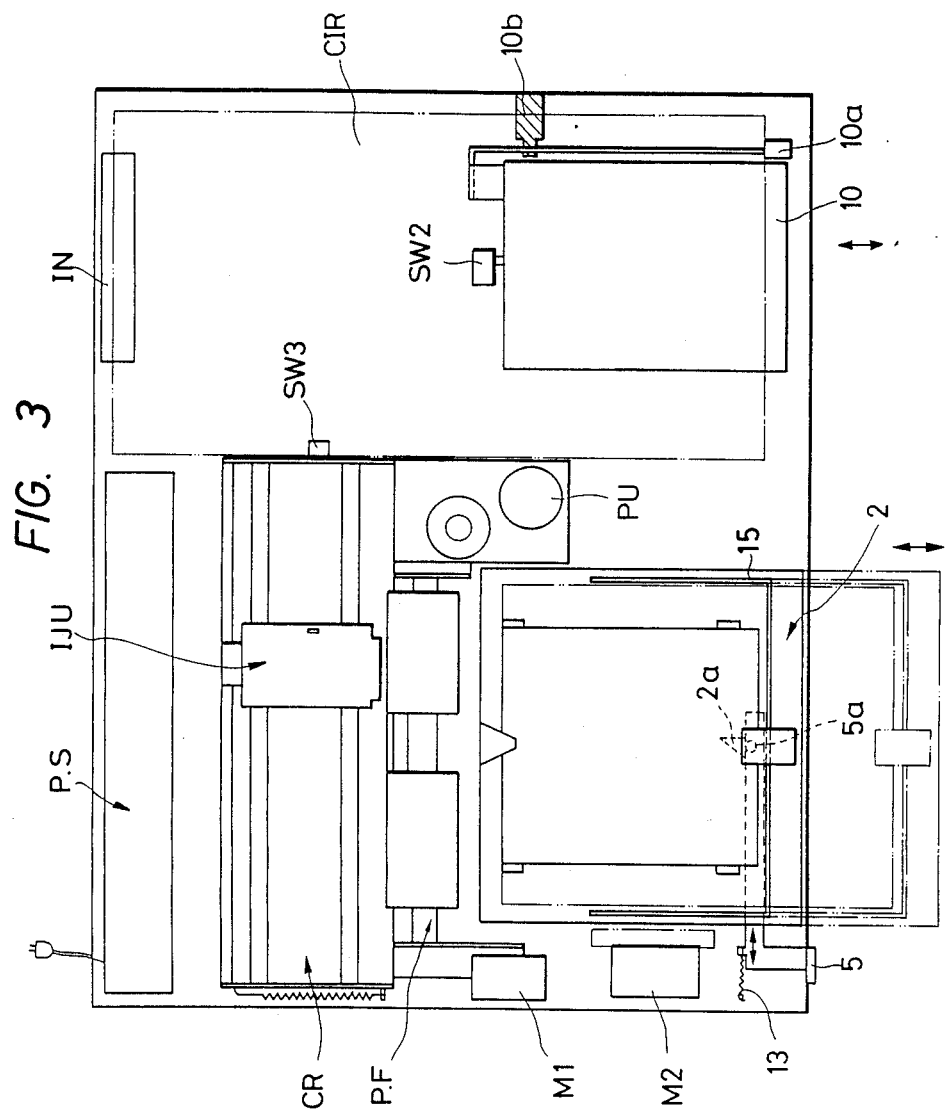
FIG. 3 is a plan view schematically showing an internal structure of the printer apparatus.

FIG. 3 is a plan view schematically showing an internal arrangement of the printer body 1, and illustrates the principal layout.

A carriage system CR (to be described later) is disposed in an inner left portion of the printer body 1. The ink-jet head IJU is main-scanned by the carriage system CR. A paper feed system PF is disposed in front of the carriage system CR. The paper feed system PF comprises a platen roller 22, paper feed rollers 18, a paper feed motor M2, a paper feed motor M1, and the like, and will be described later in detail.

A pump system PU is disposed at the central portion in the printer body 1. The pump system PU is constituted by a negative pressure generating mechanism, a valve mechanism, a cap 104, and the like. As can be seen from FIGS. 2 and 3, the ink cartridge 10 is held on the right side in the printer body 1 and at the same level as the lower surface of the body 1, and to be lower than the ink-jet head IJU, so that the distal end of the ink-jet head IJU is kept at a negative pressure so as to prevent ink leakage from the distal end of the ink-jet head IJU.

A lever 10a is pivotally arranged about a pivot 10b fixed to the printer body 1. When the lever 10a is operated, the ink cartridge 10 can be detached (exchanged). A switch SW2 for detecting the presence/absence of the ink cartridge 10 is disposed behind the ink cartridge 10.

An electrical circuit CIR fixed to the printer body 1 by a known means is arranged above the ink cartridge 10. The electrical circuit CIR is connected to an input terminal IN exposed to the rear right side of the printer body 1. A power supply PS is disposed on the rear left side of the printer body 1.

Since the power supply system is arranged as described above, a substrate design can be simplified, and an influence caused by heat generated by the circuit to the ink cartridge 10 and the ink-jet head IJU can be minimized. Since the mechanical system and the electrical system are separately disposed, assembly and maintenance are facilitated.

The knob 5 for loading/unloading the cassette 2 is formed to have a substantially L shape, and is mounted to be partially exposed from the front surface of the printer body 1. The knob 5 is biased inwardly by a spring 13, and can be slid along a direction indicated by an arrow by a guide pin (not shown). A pin 5a projects upward from the distal end portion of the knob 5 extending to the lower central portion of the cassette 2. A triangular cam 2a is fixed to the central portion of the lower surface of the cassette 2 to be locked by the pin 5a. The cam 2a and the pin 5a constitute a lock mechanism for the cassette 2. Note that an alternate long and two short dashed line in FIG. 3 indicates a cassette mounting state.

(Cassette)

A structure of the cassette 2 for storing printing sheets P will be described with reference to FIGS. 4 to 8.

Figure 4:
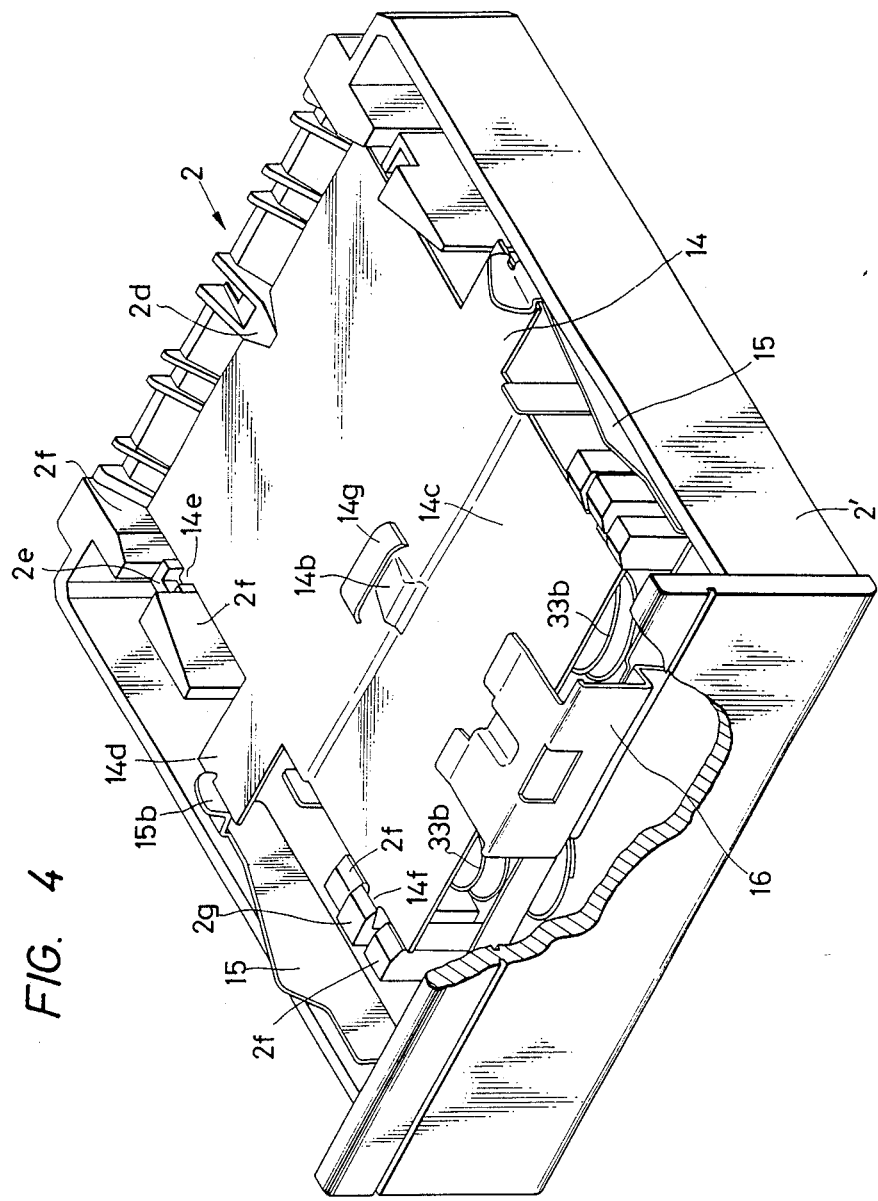
FIG. 4 is a partially cutaway perspective view showing a structure of a cassette.

FIG. 4 is a partially cutaway perspective view of the small-sized cassette 2. The cassette 2 comprises a box-like cassette body 2' whose upper surface is open. The cassette body 2' has the cam 2a for locking the cassette on its lower surface, s shown in FIGS. 3 and 8. Furthermore, as shown in FIG. 8, the cassette body 2' is provided with a receiving portion 2b for receiving a spring 31 mounted on the lower surface of the printer body 1 through a mounting portion 32.

In this manner, the cassette 2 receives a biasing force by the spring 31 toward an unloading direction. Therefore, when the locking cam 2a and the pin 5a are disengaged from each other to release locking, the cassette 2 can be automatically unloaded forward by the biasing force of the spring 31.

Figure 8:
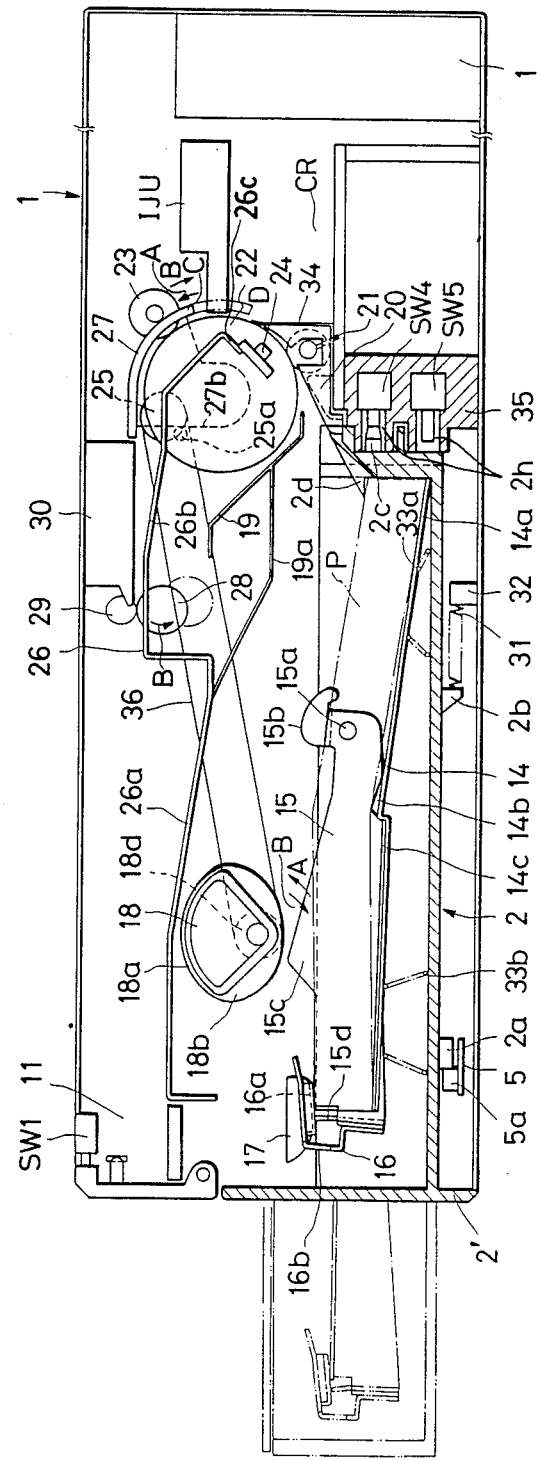
FIG. 8 is a side sectional view showing a structure of an interior of a printer body in which a cassette is inserted.

As shown in FIG. 8, two holes 2h are formed in the cassette body 2' and vertically aligned. A pin 2c is selectively disposed in the holes 2h. Projections are formed on a projecting portion 35 projecting from the bottom portion of the printer body 1 and are engaged with the holes 2h. Recesses in which the pin 2c is selectively inserted are formed in the end faces of the projections. Switches SW4 and SW5 which are operated by the pin 2c are respectively provided to the two recesses.

The small cassette 2 has the pin 2c corresponding to only the upper hole 2h, and selectively operates the switch SW4. A large cassette has the pin 2c corresponding to only the lower hole 2h, and selectively operates the switch SW5. Thus, the size of cassettes can be detected.

In this embodiment, only two types of cassettes are described in detail. However, the present invention is not limited to this, and three or more cassettes can be discriminated. The reason why the pin 2c is to be inserted in the hole 2h is as follows. When the cassette 2 is removed from the printer body 1 and sheets P are stored therein, the pin 2c can be prevented from being broken or a hand of an operator can be prevented from being dirty. Furthermore, during paper jam, when the cassette 2 is removed and a jamming sheet is removed from the platen roller 22, the switches SW4 and SW5 can be prevented from being erroneously operated to cause an erroneous operation. Therefore, the switches SW4 and SW5 are arranged so as not to be touched by a hand or a finger.

As shown in FIG. 4, a sheet front press 2d is integrally formed in front of the cassette body 2' and at the central portion in the widthwise direction of the sheet P. The front press 2d has a triangular section, its lower surface is substantially horizontally arranged, and its inclined surface is tilted upward and forward. In this front press 2d, when the sheet P pressed by the front press 2d is once pulled backward and is then fed forward, the sheet P is not caught by the front press 2d and is lifted upward along the inclined surface.

The reason why the front press 2d is arranged on only the center of the widthwise direction of the sheet P is that the following advantages can be obtained as compared with a case wherein it is arranged on a front surface or two end portions:

1. A load upon separation is small.
2. Upon separation, since a sheet can be kept flat at three points, i.e., the two paper feed rollers 18 and the front press 2d, the sheet P can be stably separated.
3. When a sheet is fed toward the platen roller 22, the front press 2d is located at the center and is locally present, so that the sheet can hardly be caught thereby even if the sheet is curled.

Note that the front press 2d is integrally formed on the cassette body 2' in this embodiment. However, the present invention is not limited to this. For example, the front press 2d may be vertically movably mounted on the cassette body 2' to abut against the uppermost sheet by its own weight. The front press 2d may be pivotally arranged.

An inner plate 14 is stored in the cassette body 2' to be vertically movable. Guides 2e for guiding the inner plate 14 in a longitudinal direction thereof are arranged at the front side portions of the cassette body 2'. A guide projection 14e projecting from the side front edge portion of the inner plate 14 is inserted and guided in each guide 2e. Side guides 2f for the sheet P are disposed on the two side front portions of the cassette body 2'. Regulating portions 2g for regulating upward movement of the inner plate 14 are formed on the two side rear portions of the cassette body 2'. The regulating portions 2g are arranged to press projections 14f projecting from the side rear edges of the inner plate 14. In the cassette body 2', the upward movement of the inner plate 14 is regulated by the regulating portions 2g and the front press 2d. Note that the two guides 2e, the side guides 2f, and the regulating portions 2g are integrally formed on the cassette body 2'.

The inner plate 14 described above is constituted by an inclined surface 14a which is provided in a front half portion and is inclined downward and forward, a projection 14b provided at the center, a frictional member 14c which is in contact with the horizontal surface formed in a rear half portion, a soft sheet 14g covering the projection 14b, guide portions 14e and 14f for respectively engaging with the guides 2e and the side guides 2g of the cassette body 2', and contact portions 14d contacting separation levers 15 (to be described later). Front and Rear portions of the inner plate 14 are biased upward by coil springs 33a and 33b, plate 14 are biased upward by coil springs 33a and 33b, respectively.

Each separation lever 15 has a substantially U shape. The proximal end portions of the separation levers 15 extend along the rear edges of the cassette body 2', and their end portions extend to portions near the central portions of the side edges of the cassette body 2' Cam portions 15b and 15c are formed on the end portions of each lever 15, respectively. Each separation lever 15 is pivotally supported about a pivot 15a arranged near the central portion in the longitudinal direction of the cassette body 2'.

Note that the separation levers 15 need not be supported for swinging movement as described above. For example, the levers 15 may be pivotally mounted on the cassette body 2' in another fashion. That is, the separation levers 15 need only be pivotally supported.

A separation portion 15d is provided near the central portion of the proximal end portion of each separation lever 15. A separation plate 16 is fixed to the proximal end portion of each separation lever 15 having the separation portion 15e. Each separation plate 16 comprises a separation portion 16a having a projection projecting downward and a paper regulating portion 16b.

Figure 7A:
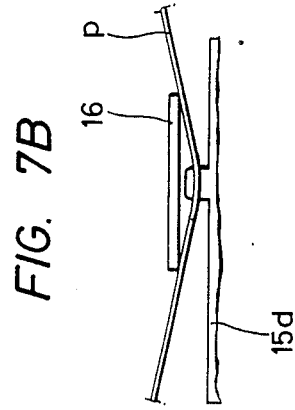
FIGS. 7A and 7B are front views respectively showing a shape of the separation plate and its modification.
Figure 7B:
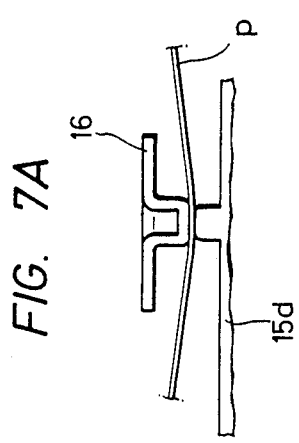

The reason why the separation portion 16a of the separation plate 16 has the downward projection as shown in FIG. 7A is to decrease a contact resistance against a sheet and to cope with a curled sheet. That is, if the separation portion 16a is formed flat, as shown in FIG. 7B, a sheet cannot enter the separation portion due to the influence of the two ends of a flat plate. However, if the separation portion has a projection, the sheet can easily enter a gap defined between the separation portions 15d and 16a and can be separated. A size t between the separation portions 15d and 16a is determined to have the following relation:

$$t_1 < t < 2t_1$$

where $t_l$ is the thickness of the sheet P.

Each separation portion 16a is inclined at an angle $\theta$ with respect to the backward direction of the sheet, as shown in FIG. 6A. Even if the sheet is curled downward, as shown in FIG. 6B, the separation portion 16a is not influenced by the curled sheet. In this manner, any curled sheet can satisfactorily enter a gap t using the inclined surface of the separation portion 16a as a guide.

Note that the frictional member 14c of the inner plate 14 is arranged to feed the lowermost sheet in the cassette body 2', and has the same effect as a known separation method (ex. pawl separation). The frictional member 14c is set to have a frictional coefficient substantially equal to or larger than that of a sheet, and is formed of, e.g., suede or cork.

The sheet 14g of the inner plate 14 is arranged to protect a paper printing section. More specifically, the sheet P is inserted in the cassette body 2' while its printing surface faces down, if there were no sheet 14g would receive a concentrated bending load by the projection 14b and locally deformed and due to such local deformation, delicate miscoloring or damage may locally occur. In order to prevent this, the sheet 14g (e.g., a fabric such as suede is provided so that the deformation is not concentrated but distributed.

Assume that the projection 14b of the inner plate 14 is arranged to extend throughout the overall width of the plate 14. When a sheet is pushed by the pair of paper feed rollers 18, if a sheet is curled, the effect of the projection 14b is impaired due to a large thickness of the sheet. For this reason, the projection 14b is locally provided at the center of the inner plate 14, and is pressed downward by the pair of paper feed rollers 18, so that the curling in the longitudinal direction is forcibly formed and the distal end portion of the sheet is effectively floated by utilizing the rigidity of the longitudinal curl. This fact has already been experimentally demonstrated.

The cam portions 15b and 15c are formed into shapes so as to press downward the inner plate 14 contacting the cam portions 15b and 15c against the biasing forces of the coil springs 33a and 33b when the separation levers 15 are pivoted during loading of the sheets P, as shown in FIG. 5. In this manner, when the inner plate 14 is pressed downward upon operation of the cam portions 15b and 15c during loading of the sheets P, the distal end portion of the inner plate 14 is largely separated downward from the front press 2d of the cassette body 2', as shown in FIG. 5. As a result, the distal end portion of the bundle of sheets P to be loaded can satisfactorily enter a gap between the front press 2d and the distal end portion of the inner plate 14.

When the separation levers 15 are pivoted and returned to home positions while the bundle of sheets P are loaded on the inner plate 14, the cam portions 15b and 15c of the levers 15 can no longer press the inner plate 14, and hence are lifted upward by the biasing forces of the coil springs 33a and 33b. In this manner, the distal end portion of the bundle of the sheets P is elastically urged against the lower surface of the front press 2d.

For a large-sized cassette, it can be considered that the separation portion 15d and the separation plates 16 are shifted backward and a width is increased. Substantially the same operation as above is performed, and a detailed description thereof will be omitted. However, as can be seen from FIG. 3, the U-shaped portions of the separation levers 15 of the small- and large-sized cassettes have the same width, and these cassettes also have the same width.

(Cassette Loading Section)

As has been described above with reference to FIGS. 2, 3, and 8, the printer body 1 has the knob 5 for locking the cassette 2 in a loading state, and the spring 31 for biasing the cassette 2 in the unloading direction.

As shown in FIG. 8, the projecting portion 35 described above is provided for the back-and-forth direction of the cassette 2, and guides 17 are provided for the vertical direction thereof. The guides 17 are engaged with the projections 15c formed on the separation levers 15 during loading of the cassette 2 so as to temporarily forcibly pivot the separation levers 15 downward. In this manner, a bending load is applied to the sheets P loaded in the cassette 2 about the front press 2d of the cassette body 2' and the projection 14b of the inner plate 14 upon loading of the cassette 2, thereby laterally curling the sheets to correct longitudinal curl (that is, sheets are normally curled longitudinally with respect to a feed direction).

When the cassette 2 which is loaded in the printer body 1 is unloaded, the knob 5 is slid in the lateral direction to release the lock, so that the cassette 2 is popped forward by the biasing force of the spring 31. During this unloading operation, the guides 17 abut against the cam portions 15b and 15c of the separation levers 15. Thus, unloading of the cassette 2 is stopped at an appropriate position at which the cassette 2 is partially popped from the printer body 1, thus preventing an accident, e.g., dropping of the cassette 2.

(Paper Feed System PF)

The paper feed system PF will be described with reference to FIGS. 8 and 9.

The paper feed system PF comprises the paper feed rollers 18 engaged with the uppermost sheet of the loaded sheets P to feed the sheet. Each paper feed roller 18 is formed into a semilunar shape to facilitate loading-/unloading of the cassette 2. The rollers 18 are integrally constituted by roller bodies 18a which are disposed to be separated from each other along a shaft, a shaft 18c on which the roller bodies 18a are coaxially fixed, a pulley 18d coaxially fixed at a front end of the shaft 18c, and a gear 18e which is coaxially fixed adjacent to the pulley 18d and has a pin 18f on its outer periphery.

The two edge portions of the feed rollers 18 have cam portions 18b formed of a resin having a relatively small frictional force. A rubber member as a high-frictional member is adhered to the circumferential surface of each roller body 18a.

The above-mentioned shaft 18c is rotatably arranged on a base plate (not shown) of the printer body 1 through a bearing and the like, and is coupled to the pulse motor M2 as the paper feed motor. The pulley 18d is coupled, through a belt 36, to a pulley 25 having a pin 25a on its outer periphery to perform 1:1 rotation. The pulley 25 is supported on the base plate (not shown) so as to be located above and adjacent to the platen roller 22 (to be described later). Note that the pin 25a is arranged to engage with a cam portion 27b of a movable paper guide 27 (to be described later).

A switch SW6 is disposed outside the gear 18e. The switch SW6 is operated by the pin 18f of the gear 18e, and hence serves as a switch for detecting an initial position of the paper feed rollers 18.

As shown in FIG. 8, paper guides 19 and 20 are fixed in the printer body 1. One paper guide 19 is arranged so that its distal end portion extends below the platen roller 22 (to be described later). The paper guide 19 is arranged to prevent that a fed sheet is in contact with the outer periphery of the platen roller 22 formed of rubber and cannot reach a rolling contact portion between the platen roller 22 and the register rollers 21, for preventing skew, which is in rolling contact with the platen roller and serves as an idler roller.

More specifically, the paper guide 19 comprises a flat portion 19a which extends substantially horizontally to be located in front of the distal end portion. The flat portion 19a serves to press the sheet P from the above so as to prevent an excessive loop of the sheet P during its feeding (to be described later). With this arrangement, when a sheet is excessively looped after the leading end of the sheet abuts against the rolling contact portion between the register rollers 21 and the platen roller 22, the leading end portion Pf of the sheet can be prevented from being returned and separated from the rolling contact portion between the register rollers 21 and the platen roller 22. In addition, since the loop is pressed from the above, a convey force (propelling force) is generated by a spring force of the sheet. In particular, in order to assure a wide printing range like in this embodiment, even when the register rollers 21 are located in a rear portion, the leading end Pf of the sheet can reliably reach the rolling contact portion between the rollers 21 and 22.

The platen roller 22 is arranged to feed a sheet fed by the paper feed rollers 18 to a printing section. The platen roller 22 is constituted by inserting a rubber roller in a shaft 22a under pressure. The register rollers 21 are disposed to be urged against the peripheral surface of the lower rear half portion of the platen roller 22, and pinch rollers 23 are urged against the outer peripheral surface of the upper rear half portion of the platen roller 22. Note that the register rollers 21 and the pinch rollers 23 are biased by a spring (not shown) and urged against each other.

The sheet P is fed upon rotation of the platen roller 22 in a state wherein it is clamped between the register rollers 21, the pinch rollers 23, and the platen roller 22. A gap between the register rollers 21 and the pinch rollers 23 defines an effective range of a printing operation, in other words, a printing range. That is, if the upper end of a sheet is not engaged with the pinch rollers 23, a satisfactory printing result cannot be obtained, and if the lower end of a sheet is not engaged with the register rollers 21, a satisfactory printing result cannot be obtained.

For this reason, a gap between the register rollers 21 and the pinch rollers 23 is narrowed as small as possible within a range not to interrupt a printing operation by the ink-jet head IJU. In other words, as described above, in order to assure a wide printing range, the lower register rollers 21 are disposed to be located in a rearmost portion.

An annular recess is formed in the central peripheral surface, i.e., the central portion in a widthwise direction of the platen roller 22. A paper sensor 24 for detecting whether or not the sheet P is wound around the platen roller 22 is disposed in the recess. The paper sensor 24 comprises a reflection type photosensor, and is fixed to a guide plate 26 (to be described later) so as to maintain a predetermined position even when the platen roller 22 is rotated.

The paper sensor 24 is located to detect the leading end of the sheet slightly projecting upward from the register rollers 21. Note that the paper sensor 24 is not limited to the reflection type photosensor but may be a transmission type photosensor or a mechanical switch such as a proximity switch or a limit switch. That is, any sensor may be adopted if it can detect the leading end of the sheet P.

The above-mentioned guide plate 26 is fixed to the base plate (not shown) of the printer body 1. The guide plate 26 is constituted by a stacker portion 26a which is located above the paper feed rollers 18 and temporarily stacking discharged sheets, a paper guide portion 26b for guiding a sheet subjected to the printing operation toward pairs of discharge rollers 28 and 29 (to be described later), and a mounting portion 26c for mounting the paper sensor 24.

A leaf spring 34 for pressing a sheet is disposed to be in contact with the outer peripheral surface between the lower register rollers 21 and the platen roller 22. The sheet passing the lower register rollers 21 can be reliably brought to a gap between the platen roller 22 and the ink-jet head IJU by the leaf spring 34 without being separated from the outer peripheral surface of the platen roller 22.

A movable paper guide 27 is provided so that a sheet can be guided to be satisfactorily fed along the outer peripheral surface of the platen roller 22 between the ink-jet head IJU and the upper pinch rollers 23. The movable paper guide 27 is pivotally supported about the shaft 22a of the platen roller 22, and is biased counterclockwise a spring 37, as indicated by an arrow A in FIG. 9. The position of the movable guide 27 is regulated by a paper guide 30 fixed to the printer body 1. Although the spring 37 is arranged, the movable guide 27 can be driven by an operation of a cam. However, if the spring 37 is provided, reciprocal movement of the movable guide 27 can be smoothly performed.

The movable guide 27 further has a cam portion 27b contacting the pin 25a of the pulley 25. That is, upon rotation of the motor M2, the paper feed rollers 18 are rotated, and the pulley 25 is rotated through the belt 36. Along with such rotation, the paper guide 27 is reciprocated between points C and D around the platen roller 22.

Window portions 27a are formed on portions of the movable guide 27, corresponding to the upper pinch rollers 23, as shown in FIG. 9. The length in the circumferential direction of each window portion 27a is set to allow pivotal movement of the movable paper guide 27. As shown in FIG. 8, when the movable paper guide 27 is located at the position indicated by the point C, the pin 25a of the pulley 25 is not engaged with the cam portion 27b of the guide 27, and the guide 27 abuts against the paper guide 30 by the biasing force of the spring 37. In this state, the movable paper guide 27 is brought further upward, and opens a gap between the platen roller 22 and the ink-jet head IJU.

When the movable paper guide 27 is located at the position indicated by the point D in FIG. 8, the pin 25a of the pulley 25 is engaged with the guide 27, and the guide 27 can be pivotal upon pivotal movement of the pulley 25 against the biasing force of the spring 37. In this state, the movable paper guide 27 is pivoted downward, and closes the gap between the platen roller 22 and the ink-jet head IJU.

As shown in FIG. 9, a gear 38 is coaxially mounted on the front end of the shaft 22a of the platen 22. The gear 38 causes a driving force of the pulse motor M1 (paper feed motor) to be coupled to the shaft 22a of the platen roller 22 through a known unidirectional clutch CL constituted by a cam 39, a pin 40, and a spring 41, so as to transmit only the driving force in one direction of the pulse motor M1 to the platen 22. Therefore, the rotating direction of the platen roller 22 is limited to a direction indicated by the arrow A in FIG. 8.

The discharge rollers 28 and 29 are disposed such that rolling contact portions therebetween are located along the convey path of the sheet P which is guided by the paper guide portion 26b of the guide plate 26. The upper discharge rollers 29 comprise plastic rollers, so as to not adversely influence the printed portion of a sheet subjected to printing. As shown in FIG. 9, the rollers 29 are arranged integrally with a shaft 29a, and are rotatably supported by a bearing 47 of the printer body 1. The lower discharge rollers 28 comprise rubber rollers, and are inserted in a shaft 28a under pressure. A gear 44 is mounted integrally with one end of the shaft 28a to be integrally rotated therewith.

A base plate 42 is disposed to rotatably support the shaft 28a at its distal end. The base plate 42 is rotatably mounted on a shaft 42a at its proximal end, which is rotatably supported by a bearing (not shown). Therefore, the base plate 42 is pivoted about the shaft 42a.

A gear 43 which is rotated and driven by the pulse motor M1 is rotatably fitted on the shaft 42a. The gear 43 is meshed with a gear 44 which is located at a distal end portion of the base plate 42. The gear 44 is integrally fixed to the shaft 28a to which the lower discharge rollers 28 are coaxially fixed, and the shaft 28a rotatably extends through the distal end portion of the base plate 42. The base plate 42 and the gear 44 are coupled to each other through a frictional transmission mechanism constituted by a spring 45 and a frictional plate 46 which is urged against the distal end portion of the base plate 42 by the biasing force of the spring 45. That is, a frictional torque determined by the biasing force of the spring 45 and the frictional coefficients of the frictional plate 46 and the base plate 42 is given as $T_1$, and a load torque is given as $T_2$. In this case, if $T_1 > T_2$, the gear 44 is fixed to the base plate 42 by the frictional torque $T_1$ of the frictional transmission mechanism. For this reason, the gear 44 is rotated around the gear 43 upon rotation of the gear 43. In this manner, the base plate 42 is rotated clockwise about the shaft 42a as indicated by an arrow A, and the lower discharge rollers 28 are separated from the upper discharge rollers 29.

When the base plate 42 which is pivoted downward abuts against a stopper (not shown), $T_1 < T_2$ In this case, the gear 44 is rotated friction torque $T_1$ upon rotation of the gear 43. The lower discharge rollers 28 are rotated clockwise as indicated by the arrow A. Since the lower discharge rollers 28 are already separated from the upper discharge rollers 29, the discharge operation is substantially stopped.

In a state wherein the lower discharge rollers 28 are separated from the upper discharge rollers 29, assume that the pulse motor M1 is reversed and begins to rotate counterclockwise as indicated by an arrow B. In this case, in contrast to the case of:

$T_1 > T_2$ the base plate 42 is rotated counterclockwise about the shaft 42a, and the lower discharge rollers 28 are urged against the upper discharge rollers 29. As a result, $T_1 < T_2$ Upon counterclockwise rotation of the gear 43, the gear 44 is rotated clockwise. Thus, along with the rotation of the gear 44, the discharge rollers 28 and 29 are rotated to be in rolling contact with each other. In this manner, the paper discharge operation is executed.

In this case, the rotating directions of the gears 38 and 44 have the relationship as indicated by arrows shown in FIG. 9. More specifically, the pulse motor M1 is rotated in one direction, the gear 38 is rotated in a direction indicated by an arrow A, and the platen roller 22 is similarly rotated in the direction indicated by the arrow A through the unidirectional clutch CL. In addition, the base plate 42 is pivoted in the direction indicated by the arrow A, so that the discharge rollers 28 and 29 are separated from each other, as described above.

In this manner, the base plate 42 abuts against the stopper (not shown) to increase a load, the gear 44 is rotated in the direction indicated by the arrow A. More specifically, the platen roller 22 is always rotated against the frictional torque $T_1$. A vibration or the like of the platen motor 22 during intermittent rotation of the motor M1 can be prevented by the frictional torque $T_1$, and hence, paper feed precision can be improved.

When the pulse motor M1 is rotated in a direction opposite to the one direction described above, the gear 38 is rotated in a direction indicated by an arrow B. However, the rotation of the gear 38 is not transmitted to the platen roller 22 by means of the unidirectional clutch CL, and the platen roller 22 is stopped. The base plate 42 is pivoted in the direction indicated by the arrow B, and both the discharge rollers 28 and 29 are brought into contact with each other. Then, the gear 44 is rotated in the direction indicated by the arrow B, and the discharge rollers 28 are rotated to discharge the sheet P. More specifically, the sheet P clamped between the discharge rollers 28 and 29 are discharged.

With this unidirectional clutch CL, even if the sheet P is caught the midway along the convey path, reverse insertion of the sheet P into the platen roller 22 can be prevented. In addition, a load of the rotation system for the platen roller 22 can be removed and only the driving force for the discharge rollers 28 is required. For this reason, stability of the paper discharge operation can be improved. In particular, in a variety of severe environments, a sheet can be stably discharged. Note that the discharged sheet P is stacked on the stacker portion 26a, and can be picked up from a discharge port 11.

To summarize the arrangement of the paper feed/discharge system, upon reverse rotation of the pulse motor (paper feed motor) M2, the paper feed rollers 18 are rotated in the direction indicated by the arrow B, and the sheet P is fed in a reverse direction to enter a gap (t) between the separation portions 15d and 16a to be separated. Next, the pulse motor M2 is reversed and is rotated in a normal direction, so that the paper feed rollers 18 are rotated in a direction indicated by the arrow A, and the sheet P is fed toward the platen roller 22.

In this case, the leading end of the sheet is lifted due to the influence of the guide projection 14e of the inner plate 14, and is conveyed toward the platen roller 22 without abutting against the front press 2d. The picked-up sheet P is conveyed to the rolling contact portion between the platen roller 22 and the lower register rollers 21 through the paper guides 19 and 20. In this state, since the rotation of the platen roller 22 is stopped, skew of the sheet at the rolling contact portion can be corrected. In this case, since the second sheet P or thereafter is pressed by the front press 2d, double feeding may not occur.

The pulse motor M1 is rotated in one direction to slightly rotate the platen roller 22 in the direction indicated by the arrow A, thereby causing the sheet P to enter a gap between the platen roller 22 and the register rollers 21. The motor M1 is then stopped. Then, the pulse motor M2 is rotated, and the movable paper guide 27 is moved to the point D upon rotation of the pulley 25. Furthermore, the pulse motor M1 is rotated to feed the sheet P through a paper guide section constituted by the press spring 34 and the movable paper guide 27, so that the leading end of the sheet P is inserted in a gap between the upper pinch rollers 23 and the platen roller 22.

The pulse motor M2 is then rotated to return the paper feed rollers 18 to their initial positions (positions indicated by the solid lines in FIG. 8) and to return the movable paper guide 27 to the point C, thus allowing a printing operation. The pulse motor M1 is rotated to feed the sheet P. When the trailing end of the sheet P is disengaged from the urging point between the platen roller 22 and the pinch rollers 23, the pulse motor M2 is rotated in a reverse direction, so that the discharge rollers 28 are moved from the dotted line position to the solid line position (FIG. 8) to be in contact with the discharge rollers 29. Moreover, the discharge rollers 28 are rotated in the direction indicated by the arrow B to discharge the sheet.

The detailed operation of this embodiment will be described later.

Note that the separating/approaching operation of the lower discharge rollers 28 with respect to the upper discharge rollers 29 need not be achieved by planetary gear motion of the gear 44 by utilizing a friction. For example, this operation may be achieved by a known cam mechanism.

(Pump System PU)

The pump system PU will be described with reference to FIGS. 11 to 19.

Figure 11:
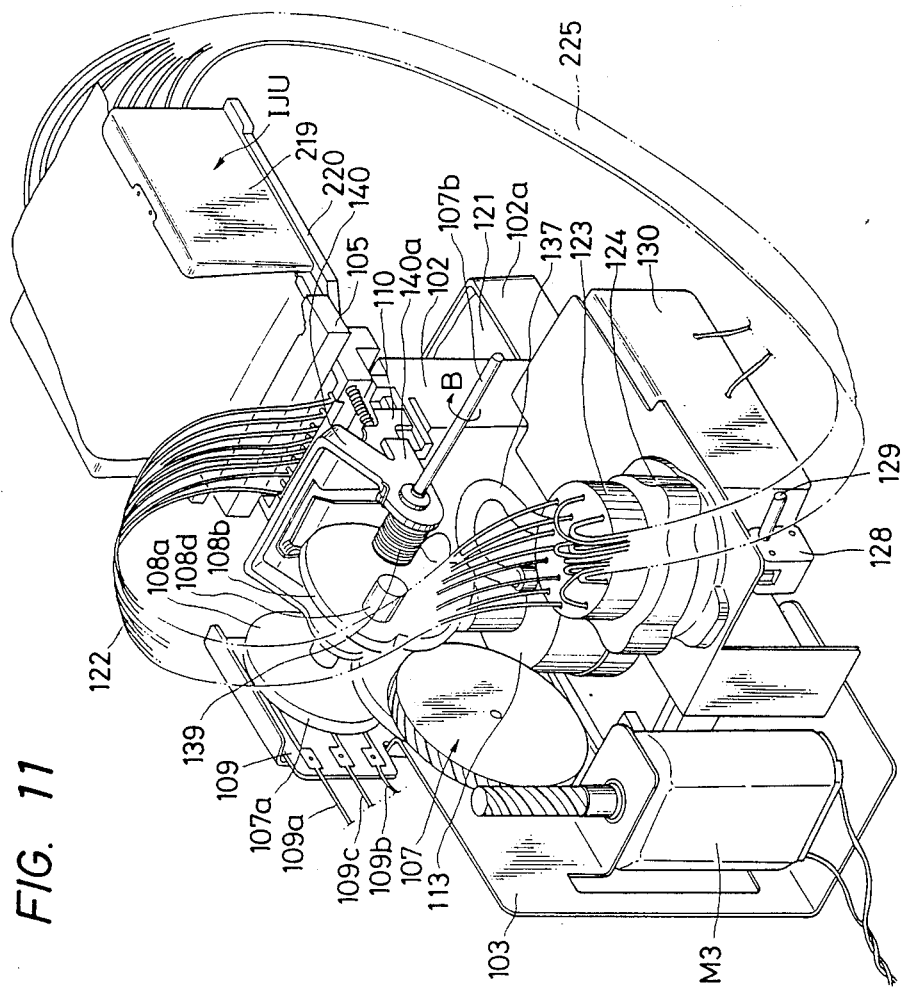
FIG. 11 is a perspective view showing schematically showing a structure of a restoration system.

As shown in FIG. 11, the pump system PU comprises a supply system unit for supplying an ink to the ink-jet head IJU and a restoration system unit for, when air is mixed in orifices 221a of nozzles 221 in the ink-jet head IJU, removing air and restoring the supply system unit.

The restoration system is constituted by a pump base 102, a base plate 103, and another base plate (not shown) facing the base plate 103. The following functional members are mounted on these plates.

As will be described later, the supply system unit comprises an ink-jet head housing 219 which is disposed to face the pump base 102. The ink-jet head housing 219 has a large number of orifices along a direction indicated by an arrow A in FIG. 12.

Figure 12:
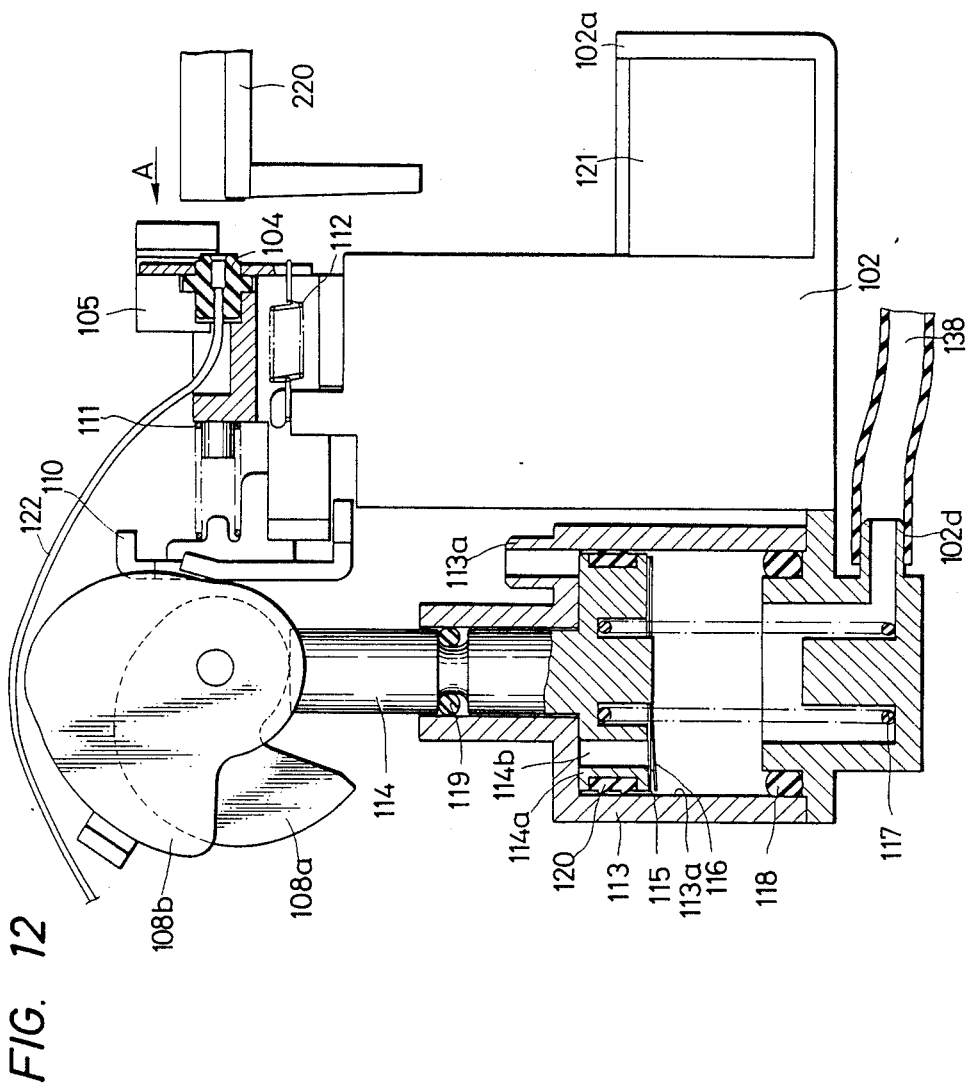
FIG. 12 is a sectional view showing a negative pressure generating mechanism of the restoration system.

A cap 104 which tightly closes or opens the orifices 221a of the nozzles 221 is arranged on the pump base 102 and can approach or can be separate from the ink-jet head housing 219, as shown in FIG. 12. The cap 104 is formed of an elastic member such as rubber, and a cap holder 105 for holding the cap 104 is mounted to be movable with respect to the pump base 102.

The cap holder 105 is drawn in a cap opening direction (a direction indicated by an arrow A) by a return spring 112. A cap lever 110 is mounted on the cap holder 105 through a press spring 111. In order to receive ink leaking from the orifices when the cap 104 is opened or closed, sheets 121 are stacked in a pump base portion 102a. Ink tubes 122 corresponding to the number of orifices 221a are inserted in the cap 104 under pressure. All the ink tubes 122 are coupled to a valve mechanism (to be described later).

Figure 13:
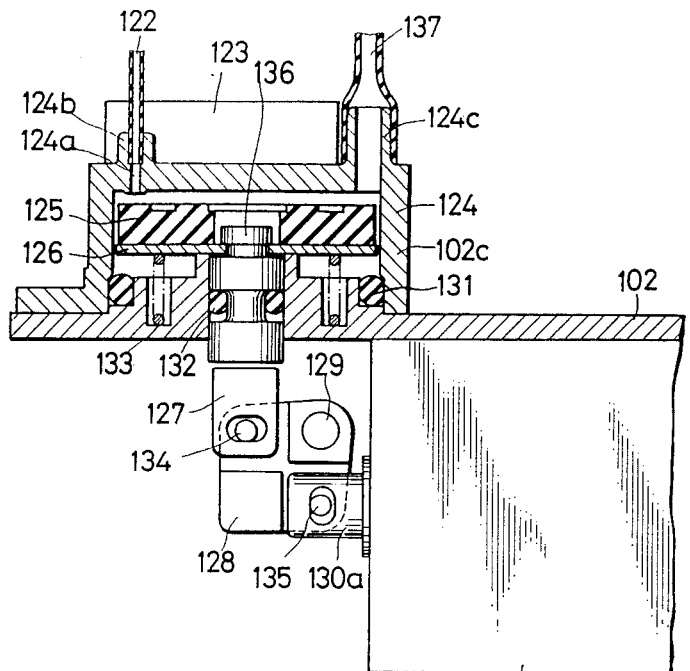
FIG. 13 is a sectional view showing a structure of a valve mechanism of the restoration system.

FIG. 13 is a sectional view of the valve mechanism.

The valve mechanism comprises a valve case 124, and the pump base portion 102b on which the valve case 124 is mounted. Holes 124a twice the number of orifices 221a are formed in the valve case 124. The ink tubes 122 extending from the cap 104 are inserted in half the holes 124, and discharge tubes 225 extending from a sub tank 230 in the ink-jet head IJU are inserted in the remaining half the holes 124. Tube receivers 123 are inserted in embossed portions 124b formed around the holes 124a under pressure. The ink tubes 122 and the discharge tubes 225 are respectively held by the tube receivers 123.

A vertically movable plate 126 on which a rubber stop 125 for tightly closing or opening holes 124a to control flow of ink is adhered is disposed in the valve case 124 as a piston body. The plate 126 is locked with a piston 127 by a stepped screw 136 with a play therebetween and to be integrally moved. The piston 27 vertically slides along the through hole of a cylindrical portion 102c formed in the pump base portion 102b in a hermetical state. Since the plate 26 is biased upward by a spring 133, the rubber stop 25 is deformed to close all the holes 124a as long as another force acts on the rubber stop 125. Note that the valve case 124 and the cylindrical portion 102c are sealed by an O-ring 131.

An upper end of a rotational lever 128 is pivotally mounted on the lower end of the piston 127 through a pin 134. An intermediate portion of the rotational lever 128 is rotatably supported through a shaft 129, and a lower end portion thereof is pivotally mounted on a projecting end of a planger 130a of a solenoid 130 through a pin 135. The solenoid 130 causes the planger 130a to be movable when it is deenergized, and causes the planger 130a to be drawn inwardly when it is energized.

The solenoid 130 is normally deenergized. Therefore, the rubber stop 125 closes the holes 124a of the valve case 124 by the spring 133 through the plate 126. When the solenoid 130 is energized, the planger 130a is drawn, and the rotational lever 128 is rotated counterclockwise about the shaft 129. The piston 127 is pressed downward through the pin 134 against the biasing force of the spring 133. In this manner, the rubber stop 125 opens all the holes 124a.

A hole 124c of the valve case 124 is formed to pour ink. The hole 124c is coupled to a negative pressure generating mechanism (to be described later) through an ink tube 137.

The negative pressure generating mechanism will be described below. The negative pressure generating mechanism comprises a cylinder 133 mounted on the pump base 102, as shown in FIG. 12. An O-ring 118 is interposed between the pump base 102 and the cylinder 113. The O-ring 118 maintains the seal between the pump base 102 and the cylinder 113. A piston 114 is disposed to be vertically slidable in the cylinder 113. The piston 114 is normally biased upward by a return spring 117. When the piston 114 is pressed downward against the biasing force of the return spring 117, it generates a negative pressure.

A hole 114b is formed in a body portion 114a of the piston 114 which is slidably arranged in the cylinder 113, so as to extend therethrough in a thickness direction. On a lower surface of the body portion 114a to which the hole 114 is open, a piston valve 115 for openably closing the opening is arranged while being biased to close the opening by a valve press 116. Air or ink flow is limited from upward toward downward by the piston valve 115. Ink flowing from a port 113a of the cylinder 113 through the ink tube 137 from the valve mechanism passes through the hole 114b of the piston 114, and is discharged from a discharge port 102d. Then, the discharged ink is flowed to a discharged ink reservoir (not shown) through an ink tube 138.

In this manner, when the cap 104 closes the ink-jet head housing 219, a negative pressure generated by the negative pressure generating mechanism is applied to the ink-jet head housing 219 through the ink tubes 122, so that air bubbles formed in the orifices of the ink-jet head housing 219 are removed through the ink tubes 122, and are discharged to the discharged ink reservoir.

A drive system for driving the negative pressure generating mechanism will be described. The drive system comprises a drive motor M3 which can be rotated in both the normal and reverse directions. The output from the motor M3 is transmitted to a final gear 107a after being decelerated by a gear train 107. A rotational shaft 107b is fixed to the gear 107a. First and second cams 108a and 108b are fixed the rotational shaft 107b to be adjacent to each other and to be integrally rotated.

A U-shaped cap lock lever 140 is rotatably mounted on the rotational shaft 107b to bridge the second cam 108b. A locking end 140a is integrally formed on the side portion of the cap lock lever 140 to extend along a radial direction. The locking end 140a is mounted along a rotational direction of the second cam 108b rather than the extending direction of the cap lock lever 140, in other words, to be deviated clockwise.

One end of a coil spring 139 wound around the rotational shaft 107b between the cap lock lever 140 and the second cam 108b is locked by the cap lock lever 140. The other end of the coil spring 139 is also locked by the cap lock lever 140. The cap lock lever 140 is integrally rotated as long as the locking end 140a thereof does not abut against a slide guide 102e of the pump base 102. When the locking end 140a of the cap lock lever 140 abuts against the slide guide 102e of the pump base 102, the cap lock lever 140 locks the cap lever 110 in a closed state, which is moved by the second cam 108b to cause the cap 104 to close an ink-jet head body 220.

The outer peripheral surface of the first cam 108a abuts against a head portion of the piston 114 serving as a negative pressure generating source, and presses down the piston 114 against the biasing force of the return spring 117 upon rotation of the first cam 108a. The outer peripheral surface of the second cam 108b abuts against the side surface of the cap lever 110, and moves the cap lever 110 against the biasing force of the press spring 111 upon rotation of the second cam 108b so that the cap 104 mounted on the cap holder 105 closes the orifices 221a of the ink-jet head housing 219.

The mounting positional relationship between the first and second cams 108a and 108b are set as follows. That is, at an initial position P.I shown in FIG. 12, cam surfaces of the first and second cams 108a and 108b closest to their rotational centers abut against the head portion of the piston 114 and the side surface of a dust cover 110, respectively. In this manner, at the initial position P.I, in the negative pressure generating mechanism, no negative pressure is generated, and the cap 104 is held such that the orifices 221a of the ink-jet head housing 219 are kept open.

Figure 16A:
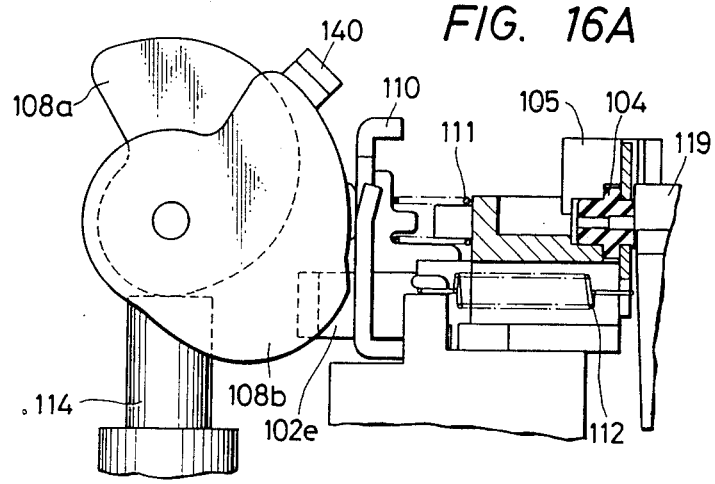
FIGS. 16A to 16C are views respectively showing operations of first and second cams 108a and 108b when a contact 141 is located at first to third operating positions.

A standby position P0 is defined in a state wherein the first and second cams 108a and 108b are slightly rotated from the initial position P.I upon operation of the drive motor M3. When the first and second cams 108a and 108b are rotated from the standby position P0 upon operation of the drive motor M3, they are brought to a first operating position P1, as shown in FIG. 16A. At the first operating position P1, the cam surface of the first cam 108a, which is closest to the rotational center, abuts against the head portion of the piston 114. At the first operating position P1, no negative pressure is generated from the negative pressure generating mechanism. Meanwhile, the cam surface of the second cam 108b, farthest from the rotational center, abuts against the side surface of the cap lever 110. At the first operating position P1, since no negative pressure is generated by the negative pressure generating mechanism, as described above, the cap 104 is held to close the orifices 221a of the ink-jet head housing 219.

Figure 16B:
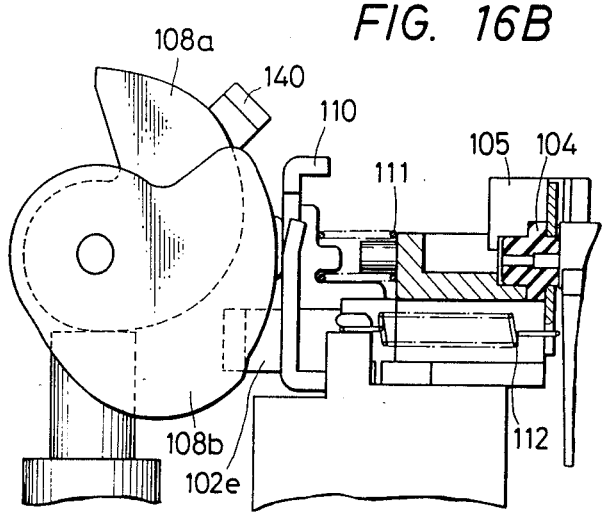

When the first and second cams 108a and 108b are slightly rotated from the first operating position P1 upon rotation of the drive motor M3, a second operating position P2 is defined, as shown in FIG. 16B. At the second operating position, the cam surface of the first cam 108a, gradually farther from the rotational center, abuts against the head portion of the piston 114. In this manner, at the second operating position P2, a negative pressure begins to be produced from the negative pressure generating source. Meanwhile, the cam surface of the second cam 108b, farthest from the rotational center, still abuts against the side surface of the cap lever 110. At the second operating position P2, in a state wherein a negative pressure begins to be generated from the negative pressure generating source, the cap 104 is held to close the orifices 221a of the ink-jet head housing 219.

Figure 16C:
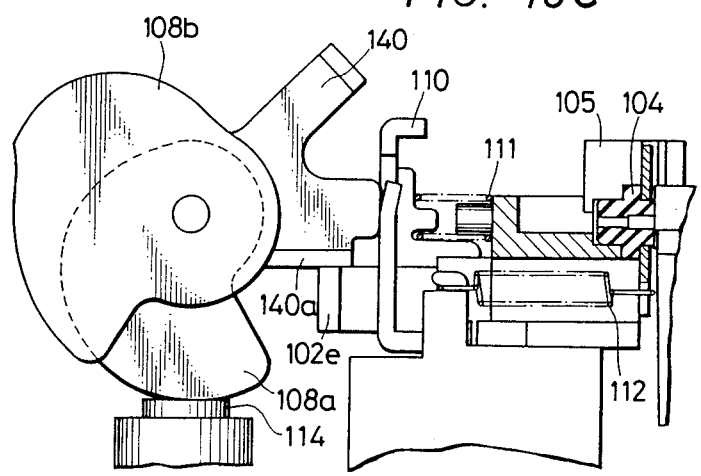

When the first and second cams 108a and 108b are rotated through a predetermined angle from the second operating position P2 upon rotation of the drive motor M3, a third operating position P3 is defined, as shown in FIG. 16C. At the third operating position P3, the cam surface of the first cam 108a, farthest from the rotational center, abuts against the head portion of the piston 114. In this manner, at the third operating position P3, the negative pressure is sufficiently generated from the negative pressure generating mechanism.

Meanwhile, the cam surface of the second cam 108b, closest to the rotational center, is brought into contact with the side surface of the lock lever 110. However, while the second cam 108b is pivoted from the second operating position P2 to the third operating position P3, before the cam surface of the second cam 108b, closest to the rotational center, abuts against the side surface of the lock lever 110, the locking end 140a of the cap lock lever 140 abuts against the slide guide 102e of the pump base 102, and the cap lock lever 140 locks the cap lever 110, which causes the cap 104 to close the ink-jet head housing 219 by the second cam 108b, in a closed state.

In this manner, at the third operating position P3, in a state wherein the negative pressure is sufficiently generated from the negative pressure generating mechanism, the cap 104 is held to close the ink-jet head housing 219.

Note that the drive motor M3 begins to rotate in a reverse direction from the third operating position P3. The first and second cams 108a and 108b execute the operations opposite to those described above, and are turned to the standby position P0.

Figure 14:
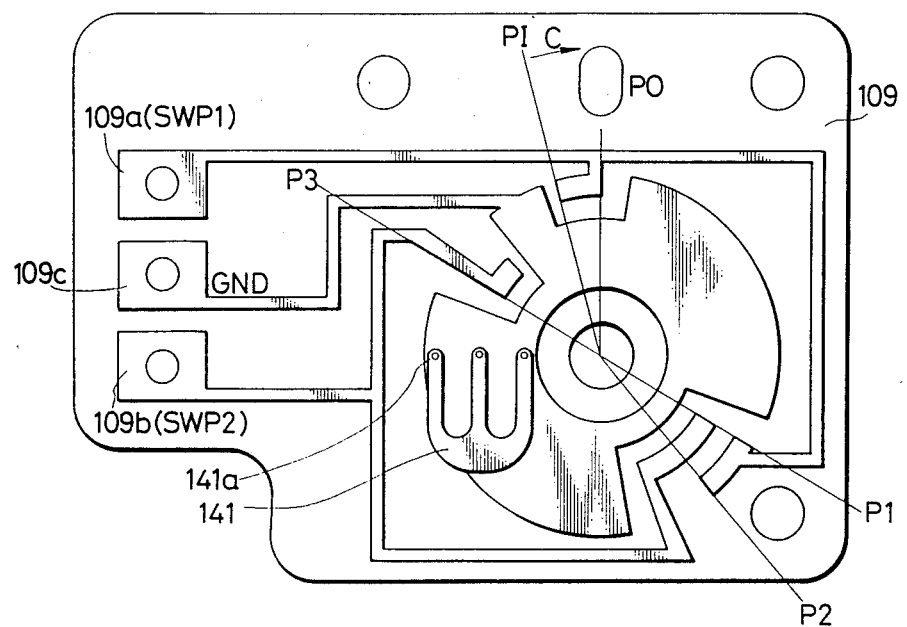
FIG. 14 is a front view showing a pump substrate for generating a control signal for the restoration system.

A contact member 141 shown in FIG. 14 is attached to the outer side surface of the outermost gear 107a in order to control an amount of rotation of the drive motor M3 (i.e., rotational positions of the first and second cams 108a and 108b). The contact member 141 has contacts 141a, 141b, and 141c which are electrically connected to each other.

A predetermined pattern PT is formed on a pump substrate 109. The pattern PT is designed such that the three contacts 141a, 141b, and 141c are in selective contact therewith in a predetermined sequence. When the contact member 141 slidably moves along the pattern PT upon rotation of the gear 107a, predetermined control signals are output from the first output terminal 109a (SWP1) and a second output terminal (SWP2), thereby controlling the drive motor M3. Thus, the phases of the first and second cams 108a and 108b are controlled. Note that a third output terminal 109c is grounded.

The above-mentioned pattern PT is arranged as follows. While the first and second cams 108a and 108b are rotated from the initial position P.I to the standby position P0, only the first output terminal 109a outputs an "H"-level signal. While the first and second cams 108a and 108b are rotated from the standby position P0 to the first operating position P1, the first and second output terminals 109a and 109b output "L"-level signals. While the first and second cams 108a and 108b are rotated from the first operating position P1 to the second operating position P2, both the first and second output terminals 109a and 109b output "H"-level signals. While the first and second cams 108a and 108b are rotated from the second operating position P2 to the third operating position P3, the first output terminal 109a outputs an "L"-level signal, and the second output terminal 109b first outputs an "H"-level signal and then outputs an "L"-level signal.

The pattern PT is designed such that the first output terminal 109a still outputs an "L"-level signal and the second output terminal 109b outputs an "H"-level signal when the first and second cams 108a and 108b are rotated clockwise from the third operating position P3.

(Ink-Jet Head IJU)

The arrangement of the ink-jet head IJU will be described with reference to FIGS. 17 and 18.

Figure 17:
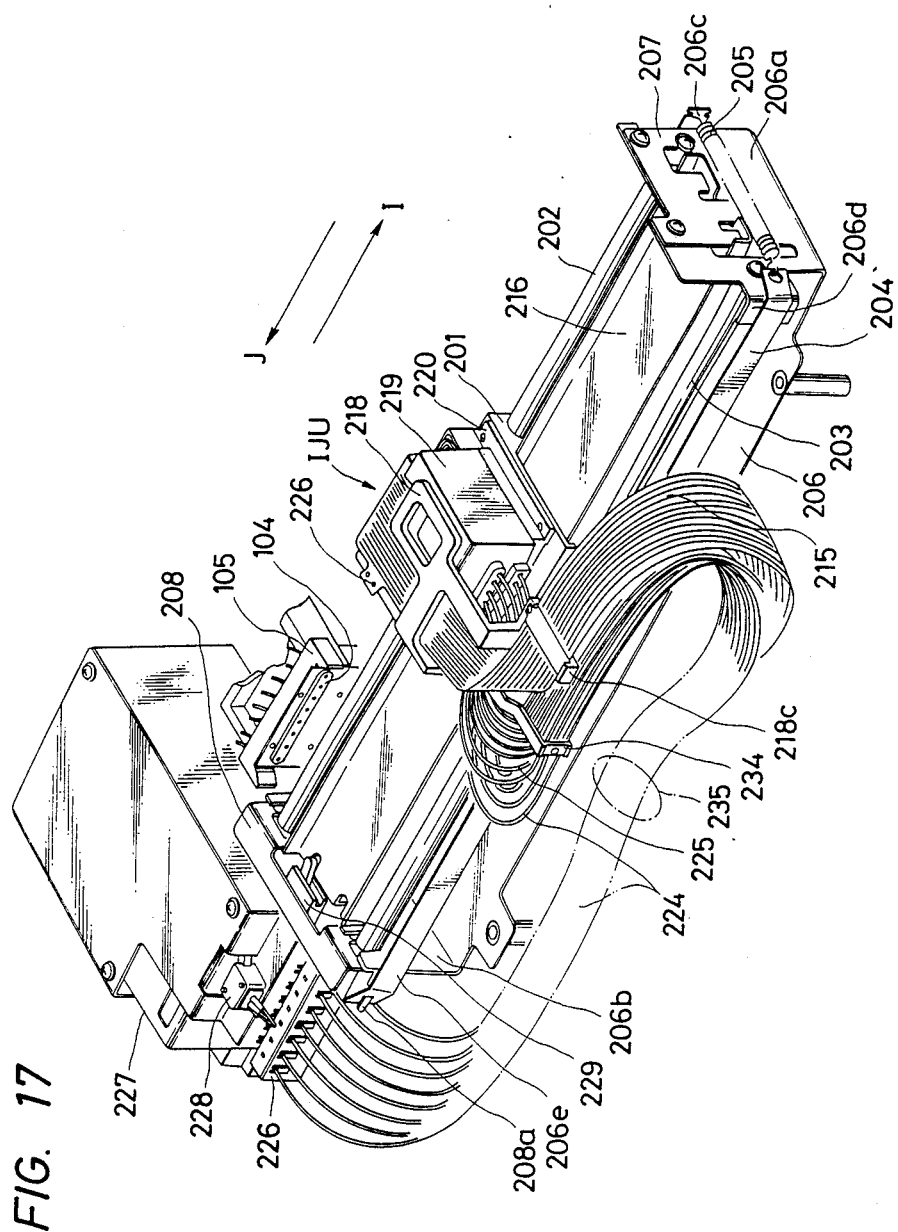
FIG. 17 is a perspective view schematically showing a structure of a carriage moving system.
Figure 18:
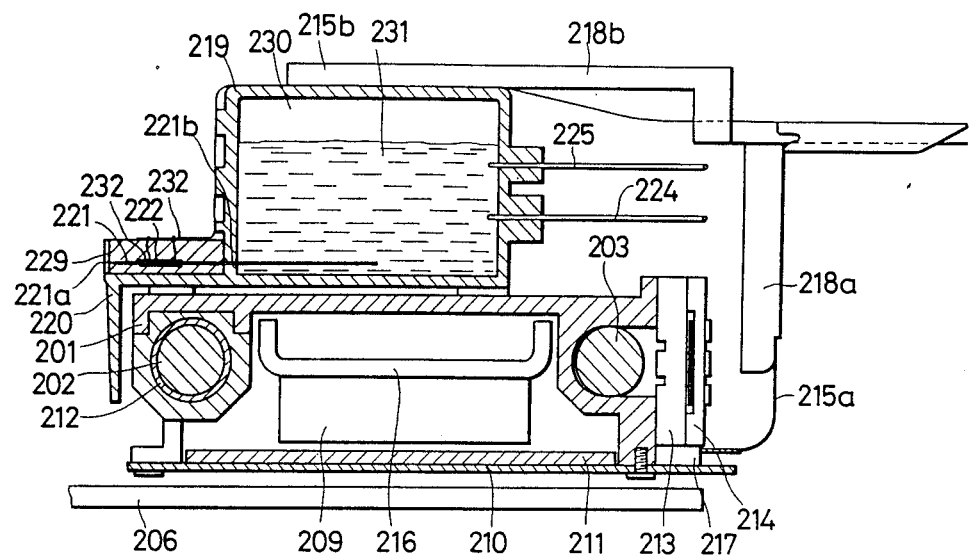
FIG. 18 is a side sectional view showing a structure or an ink supply system and a carriage.

FIG. 17 is a perspective view when the ink-jet head IJU is mounted on the carriage 201 of a reciprocating unit, and FIG. 18 is a sectional view showing a state wherein the ink-jet head IJU is mounted on the carriage 201.

As shown in FIG. 18, the ink-jet head IJU comprises the ink-jet head housing 219 and rear lid 220 which is attached to close the lower surface of the ink-jet head housing 219. A sub tank 230 is defined by an inner space surrounded by the ink-jet head housing 219 and the rear lid 220. A plurality of nozzles 221 are aligned in line on the front surface of the ink-jet head housing 219. The distal end portion (called an orifice) 221a of each nozzle 221 is positioned by a front surface plate. In order to define a pitch between adjacent nozzles 221, a central portion 221b of each nozzle 221 is fixed in position between the ink-jet head housing 219 and the rear lid 220.

A piezoelectric element 222 is adhered to each nozzle 221. Each piezoelectric element 222 is soldered to a flexible head portion 215 through a corresponding lead wire 232. An adhesive 233 is filled around each piezoelectric element 222. Ink ejection pulses are supplied to the piezoelectric elements 222 through a flexible flat cable 215 as well as carriage control signals.

As shown in FIG. 17, the flexible head portion 215 is held on the upper surface of the head housing 219 by a flexible head press 218. A connecting line portion 215b for transmitting the ink ejection pulses is guided by a flexible press 218b, and a connecting line portion 15a for transmitting the carriage control signals is guided by a flexible press 218a.

A temperature sensor 226 for detecting a temperature is arranged near the head sub tank 230. A signal from the temperature sensor 226 passes through the connecting line portion 215b and is supplied to an electrical substrate (not shown) together with other lines on the flexible head portion 215 through a connector (not shown).

(Supply Unit)

The supply unit for supplying ink to the ink-jet head IJU will be described. Ink 231 is stored in a main tank (not shown) arranged in the ink cartridge 10, and is supplied to the sub tank 230 through a needle 232 and a supply tube 224. As shown in FIG. 18, a discharge tube 233 is connected to a portion of the sub tank 230 above the supply tube 224. Ink overflowed from the sub tank 230 is returned to the restoration system through the discharge tube 233.

The level of the ink 231 in the sub tank 230 is determined to be constant in accordance with the position of the discharge tube 233. In other words, a predetermined space can be assured above the ink 231 in the sub tank 230.

The flexible head portion 215 is fixed to the flexible press 218 by screws at a flexible press portion 218c, and the supply tube 224 and the discharge tube 225 are fixed to the flexible press 218 by a tube press 234. The flexible head portion 215, the supply tube 224, and the discharge tube 225 are fixed by a tube stop (not shown) near a circular mark 235 in FIG. 17, so that their movement is appropriately regulated so as not to be caught by other members. Note that a sensor 228 is provided to the ink cartridge 10.

(Carriage System)

The reciprocating unit for reciprocating the ink-jet head IJU will be described with reference to FIGS. 17 to 19.

As shown in FIG. 17, the reciprocating unit comprises the carriage 201 on which the ink-jet head IJU is mounted. The carriage 201 is guided by a pair of front and rear guide shafts 202 and 203 to reciprocate along the platen roller 22. A yoke 216 on which a magnet 209 is mounted over the moving range of the carriage 201 is disposed below the carriage 201 and above the carriage substrate 210. The end portions of the guide shafts 202 and 203 are respectively fixed by screws to side plates 207 and 208 attached to vertical bent portions 206a and 206b.

As shown in FIG. 18, since a bearing 213 of the guide shaft 202 in front of the carriage 201 (facing the platen roller 22) requires a good sliding characteristic, a bearing of a low-friction member is inserted under pressure. A carriage substrate 210 is disposed between the magnet 209 and a base plate 206. A coil 211 for generating a propelling force of the carriage 201 is placed on the carriage substrate 210. The carriage substrate 210 is fixed to the lower portion of the carriage 201 by screws. As described above, a CR motor as a linear motor for reciprocating the ink-jet head IJU is arranged.

A ribbon-like slit plate 204, which constitutes a linear encoder, is disposed on the rear side of the moving range of the carriage 201 in order to control movement of the carriage 201. One end portion of the slit plate 204 is caught by a side plate portion 202a, and the other end portion thereof is drawn by a spring 205. The other end of the spring 205 is hooked at a carriage base plate portion 206c. In this manner, the slit plate 204 is tensed to be kept parallel to the guide shafts 202 and 203.

The slit plate 204 is vertically and horizontally aligned by grooves (not shown) formed in carriage base plate portions 206d and 206e. As shown in FIG. 19, equal-pitch slits 204a which are disposed at an equal pitch to provide an ink ejection timing are formed in an upper portion of the slit plate 204, zone slits 204b and 204b' serving as position-detected portion for indicating printing positions are formed near the two lower end portions. These slits are provided along the extending direction of the slit plate 204.

A scanning width in the large-size mode corresponds to an interval between outer edges 204d and 204d' of the zone slits 204b and 204b', and a scanning width of the small-size mode corresponds to an interval between inner edges 204c and 204c'.

A light emitting portion 214 for the linear encoder is fixed to the carriage 201. The light emitting portion 214 comprises a pair of upper and lower light emitting elements 240a and 240b which are separated at a predetermined distance. A light receiving portion 213 for the linear encoder is fixed to the carriage 201 to face the light emitting portion 214 to sandwich the slit plate 204 therebetween. The light receiving portion 213 comprises a light receiving slit plate 237 and a pair of light receiving elements 239a and 239b corresponding to the pair of light emitting elements 240a and 240b.

Equal-pitch slits 237a having the same pitch are formed on the light receiving slit plate 237 at positions corresponding to the equal-pitch slits 204a formed on the upper portion of the slit plate 204. In addition, a slit 237b is formed on the plate 237 at a position corresponding to the zone slits 204b and 204b' of the slit plate 204.

Outputs from the light receiving elements 239a and 239b are supplied to the electrical circuit CIR shown in FIG. 3 through the connector 217 and the flexible head portions 215a and 215. A home position senor SW3 for detecting that the carriage 201 is located at a home position is provided in correspondence with the home position of the carriage 201. The home position sensor SW3 comprises a limit switch which is turned on when the carriage 201 is located at the home position.

(Control Circuit)

Figure 20:
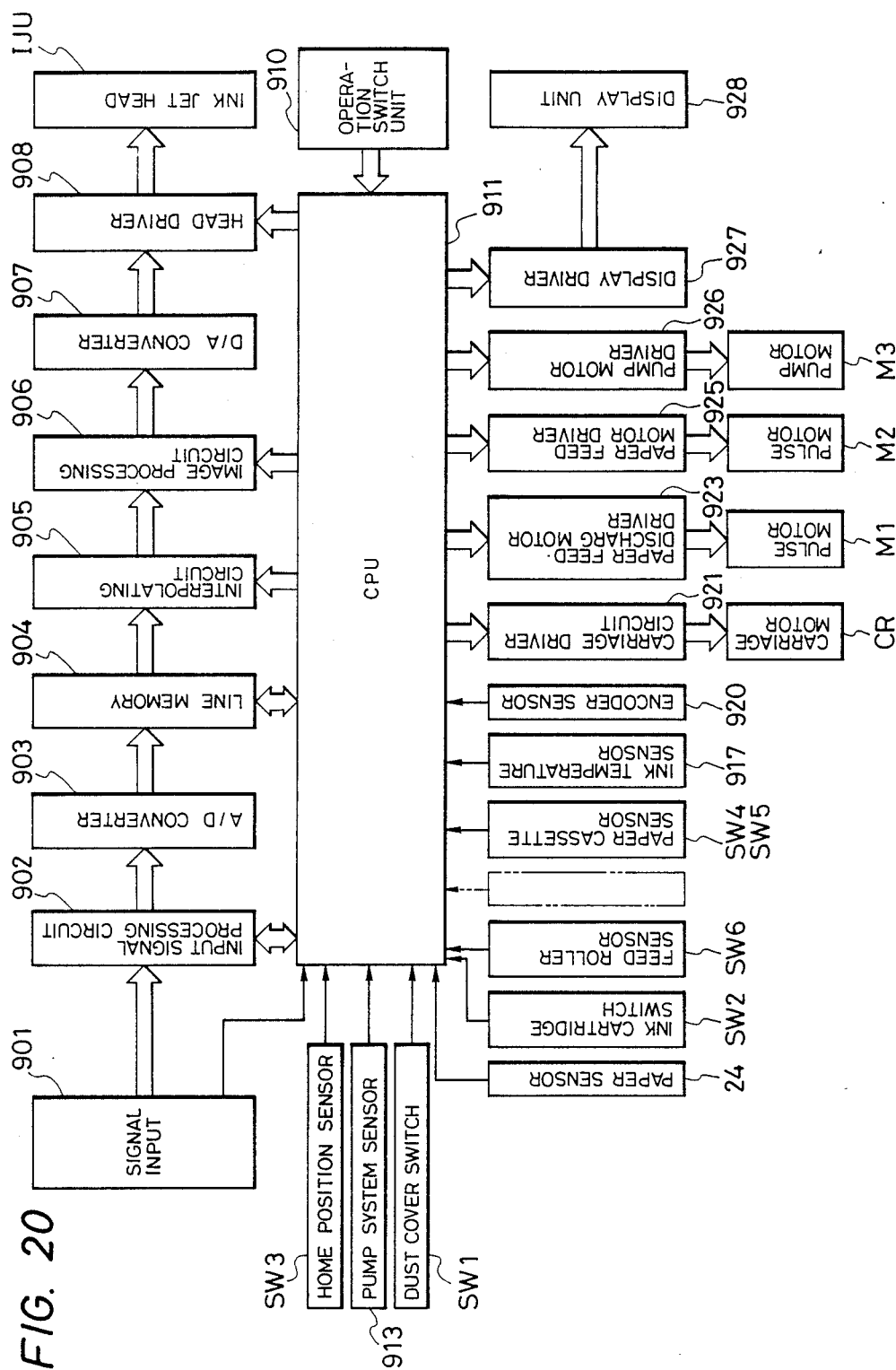
FIG. 20 is a block diagram showing the connection relationship among a CPU in a control system of the printer apparatus and various units and devices.

FIG. 20 is a block diagram of a control unit of the apparatus according to this embodiment. In FIG. 20, the control unit comprises a central processing unit (CPU) 911 serving as a main controller of the printer apparatus. The CPU 911 stores control programs shown in, e.g., FIGS. 21A to 21L in a ROM (not shown), and executes these programs to control the following peripheral circuits.

The CPU 911 is connected to a signal input unit 901. The CPU 911 receives, through the signal input unit 901, an RGB color image signal or an NTSC, PAL, or SECAM color television signal, or various color image signals formed by a personal computer or the like. The CPU 911 is also connected to an input signal processing circuit 902 for converting a color image signal other than the RGB signal into an RGB signal, a line memory 904 for storing color image data for a plurality of lines, an interpolating circuit 905 used when a color image is to be expanded, an image processing circuit 906 for performing masking processing, undercolor removal processing, and the like, of color image data, a drive circuit 908 for the ink-jet head IJU, and the like.

Note that the line memory 904 is connected to an A/D converter 903 for converting an analog RGB image signal from the input signal processing circuit 902 into digital RGB image data. The head driver 908 is connected to a D/A converter 907 for converting color image data from the image processing circuit 906 into an analog image signal. The head driver 908 is also connected to the piezo-type ink-jet head IJU.

Furthermore, the CPU 911 is connected to an operation switch unit 910. The operation switch unit 910 includes the power switch 6, the printing switch 8, the pump switch, and the like. The CPU 911 is connected to a sensor 913 for the pump system, an ink temperature sensor 917, an encoder sensor 920, a carriage motor driver 921, a driver 923 for the motor M1, a driver 925 for the motor M2, a driver 927 for an LED display unit 928, and the like. The LED display unit 928 includes the display LEDs 7a to 7e.

The operation will be described below.

(Cassette Operation)

When the knob 5 for loading/unloading the cassette is moved to the left against the biasing force of the spring 13, locking between the pin 5a fixed to the knob 5 and the cam portion 2a formed on the lower surface of the cassette 2 is released, and the cassette 2 is partially ejected outside the printer body 1 by the biasing force of the return spring 31 shown in FIG. 8. Then, the pushed-out cassette 2 is stopped at a position where the cam portions 15c of the separation levers 15 are in contact with the guides 17. As a result, both the cassette size sensors SW4 and SW5 are turned off. When the cassette 2 is manually pulled out, the cam portions 15c climb over the lower surfaces of the guides 17 and the entire cassette 2 can be pulled out.

In FIG. 5, when the separation levers 15 are rotated about the pivots 15a of the separation levers 15 in the direction indicated by the arrow A, the cam portions 15b and 15c are brought into contact with the contact portions 14d of the inner plate 14 shown in FIG. 5 and push down the inner plate 14, as shown in FIG. 5. In particular, the leading end portion of the sheet P placed on the inner plate 14 is lowered, and a gap between the sheet and the front press 2d is increased. As a result, the separation levers 15 are held in position due to their own moments and operation of the cams even if the operator releases his hand therefrom. Thus, the operator can load the sheets P along the direction indicated by the arrow B. When the separation levers 15 are returned after the sheets are loaded, the inner plate 14 is pushed upward by the biasing forces of the coil springs 33a and 33b until the upper portion of the leading end of the sheet abuts against the front press 2d.

As shown in FIG. 2, the cassette 2 is inserted in the paper feed port 11 of the printer body 1. As a result, the cam portions 15c of the separation levers 15 are pushed down by the guides 17 shown in FIG. 8, and hence, the separation plates 16 attached to the separation levers 15 are pushed downward. Then, the trailing end portion of the sheet is pushed down, and the longitudinal curl of the sheet is corrected by the projection 14b. When the cassette 2 is further pushed inwardly against the biasing force of the spring 31, the cam portions 15b and 15c slide over the guides 17, the cam portion 2a of the cassette 2 pushes away the pin 5a, thereby locking the cassette when the pin 5a slides over the cam portion 2a. In this state, the projection 35 of the printer body 1 aligns the distal end portion of the cassette 2 as shown in FIG. 8. When the small-sized cassette is selected, the switch SW4 is turned on, and when the large-sized cassette is selected, the switch SW5 is turned on. In this manner, the cassette 2 can be easily and reliably set in the printer body 1.

After loading, the leading end portions of sheets P are urged against the front press 2d by the cassette spring 33a at an appropriate pressure through the inner plate 14. At the trailing end portions of the sheets, there is no fixed member such as the front press 2d, and the separation lever unit consisting of the separation levers 15 and the separation plates 16 can be pivoted. Therefore, the upward pivotal movement of the separation levers 15 is regulated by the guides 17, and the sheets P are urged against the separation plates 16 fixed to the separation levers 15 by the rear cassette spring 33b through the inner plate 14.

In this manner, when the cassette 2 is loaded to the printer body 1, the leading and trailing end portions of the uppermost sheet P are urged against the front press 2d and the separation plates 16 by the upward biasing forces. Therefore, even if the number of stacked sheets is changed, the uppermost sheet can maintain a constant level with respect to the paper feed rollers 18.

FIGS. 21A to 21L are flow charts of various control programs executed by the CPU 911.

(Initialization Process)

Figure 21A:
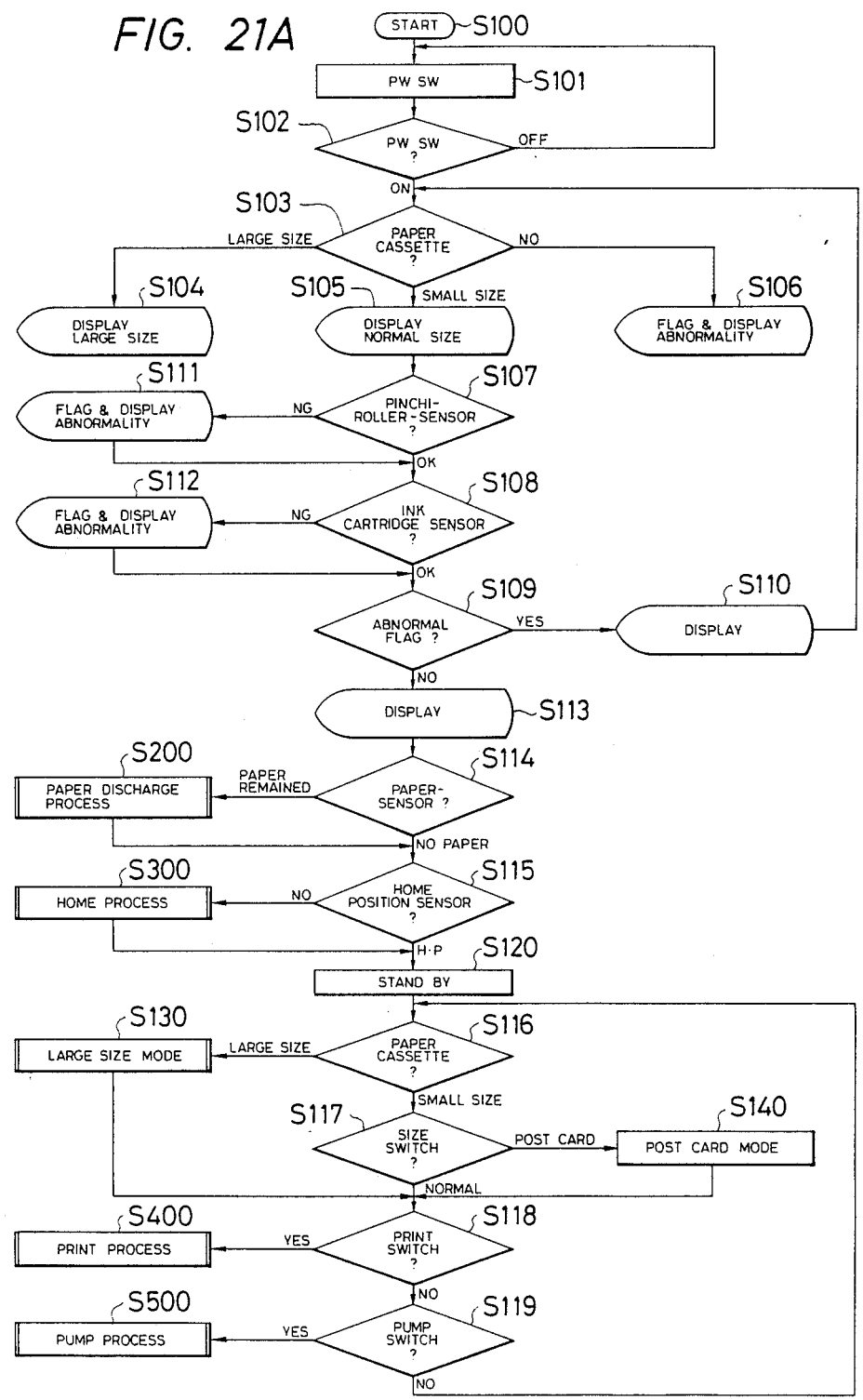
FIG. 21A is a flow chart of an initialization from power-on to a standby state.

FIG. 21A is a flow chart of an initialization process from power-on to a standby state of the printer apparatus. In step S101, an operator depresses the power switch 6. In step S102, the present state of the power switch 6 is checked. If the switch 6 is ON, the switch 6 is turned off and the flow returns to step S101. If the switch 6 is OFF, the switch 6 is turned on and the flow advances to step S103. Note that the above operations are performed by the power supply circuit, and are not related to the processing of the CPU 911.

The test and indication of conditions necessary for starting a printing operation are performed. That is, in step S103, a loading state of the cassette 2 is checked. If the cassette 2 is not loaded, an abnormality flag is set is in step S106, and the LED 7a is flickered to inform the abnormality of the paper feed system. When the cassette 2 is loaded, if the large-sized cassette (SW=ON) is selected, an indication is made to inform that the large-size mode is selected in step S104. If the small-sized cassette (SW4=ON) is selected, an indication is made to inform that a normal-size mode is selected in step S105. In step S107, the pinch roller sensor is checked. If an abnormality is found, an abnormality flag is set in step S111, and the abnormality of the paper feed system is indicated.

If no abnormality is found, the ink cartridge sensor SW2 is checked in step S108. If no ink cartridge 10 is loaded, an abnormality flag is set in step S112, and the LED 7b is flickered to inform the abnormality of the ink system. If the ink cartridge 10 is loaded, the set/reset state of the abnormality flag is checked in step S109. If the abnormality flag is set, the abnormality is indicated in step S110, and the flow returns to step S103. If no abnormality flag is set, a normal state is indicated in step S113.

In step S114, the paper sensor 24 is checked. If the sheet P is left in the convey path, a paper discharge process described later in step S200 is executed. If no sheet P is left, the home position sensor SW3 is checked in step S115. If the carriage 201 is not located at the home position, a home process described later in step S300 is executed.

As a result, if no abnormality is found, the apparatus is set in the standby state in step S120. In the standby state, cassette exchange, a printing command, and a pump command are accepted. That is, if loading of the large-sized cassette is detected in step S116, the large-size mode is selected in step S130. If loading of the small-sized cassette is detected in step S116, the size switch is checked in step S117. If the size switch is selected to be a post-card size, the post card mode is selected. If the post-card size is not selected, the normal mode is selected. If depression of the printing switch 8 is detected in step S118, a printing process step S400 (to be described later) is executed. If depression of the pump switch is detected in step S119, a pump process S500 (to be described later) is executed.

(Printing Process)

Figure 21B:
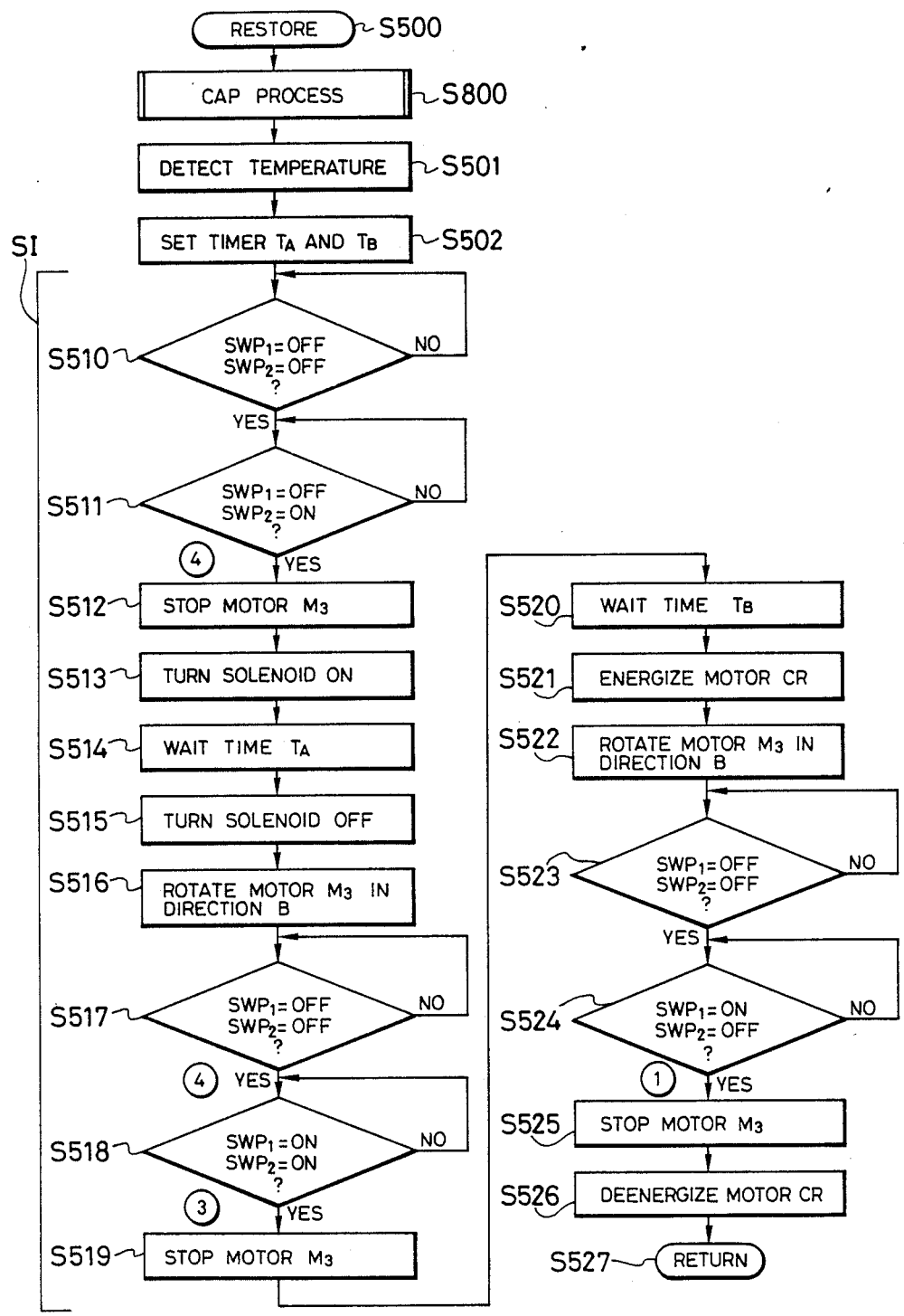
FIG. 21B is a flow chart of a pump operation of the restoration system for restoring clogging of a nozzle.
Figure 21C:
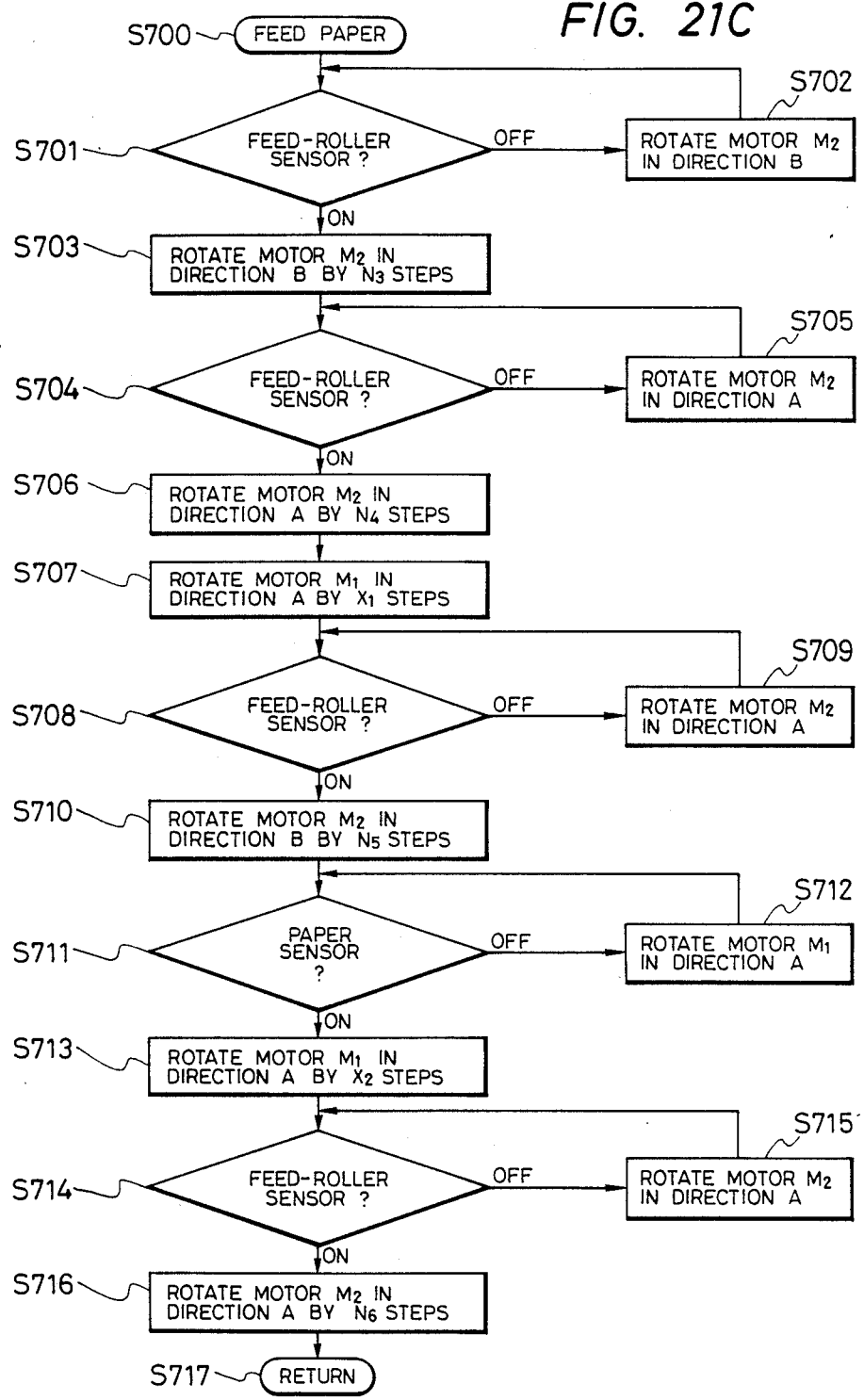
FIG. 21C is a flow chart of a paper feed process.
Figure 21D:
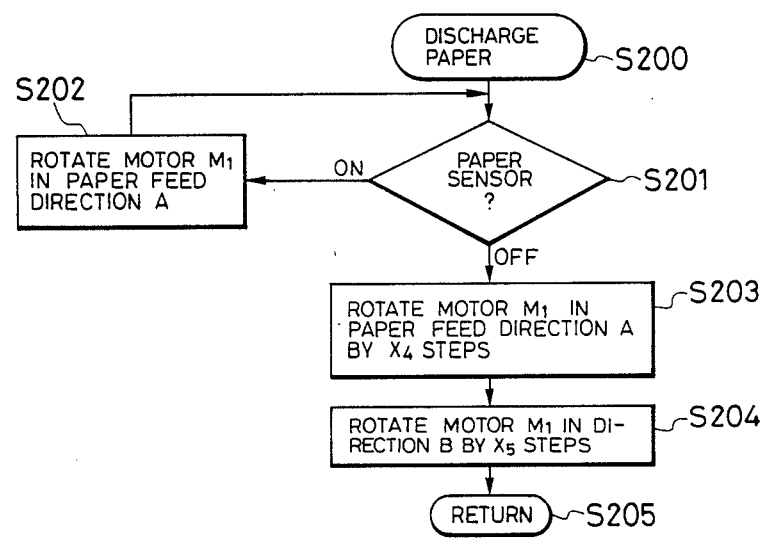
FIG. 21D is a flow chart of a paper discharge process.
Figure 21E:
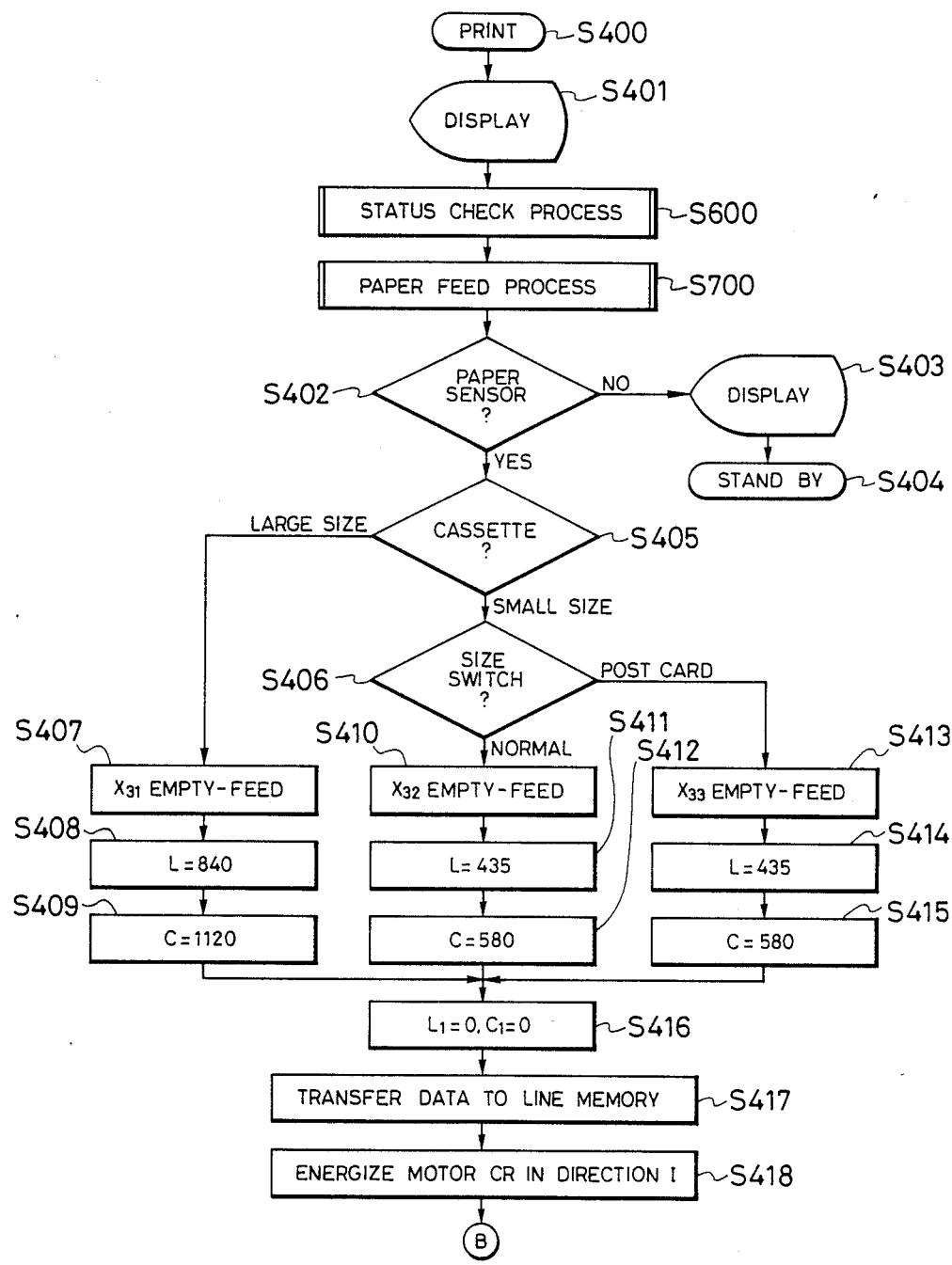
FIGS. 21E to 21G are flow charts of a printing process.
Figure 21F:
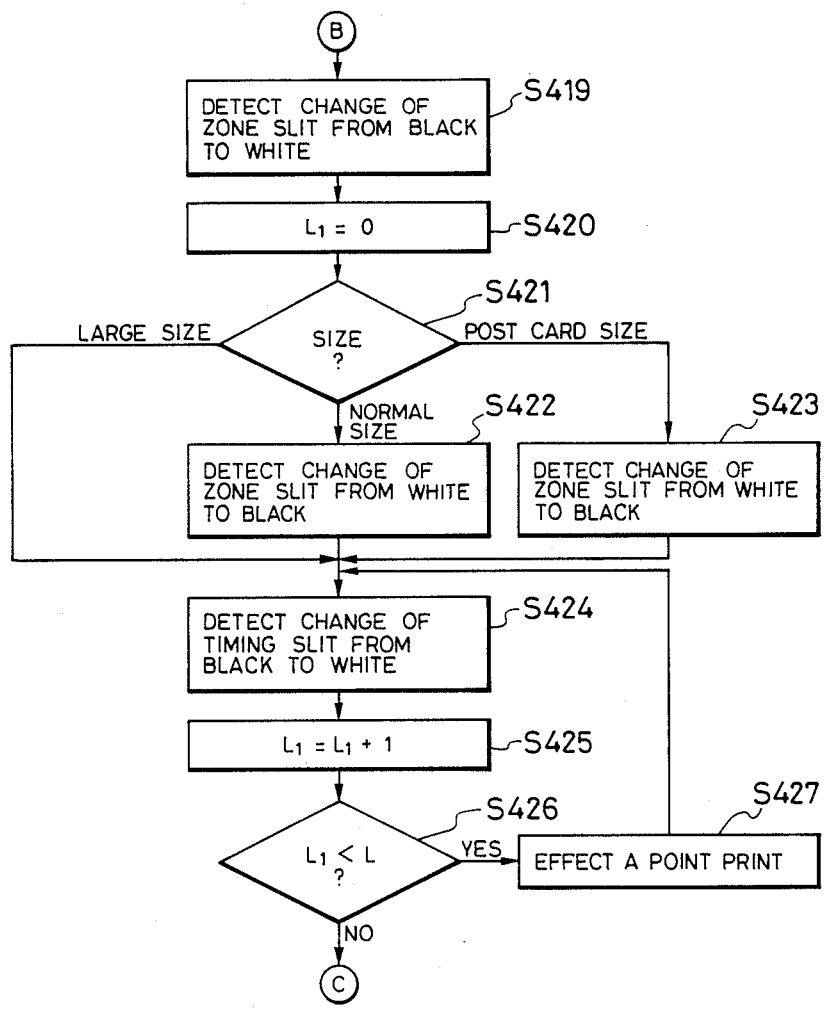
Figure 21G:
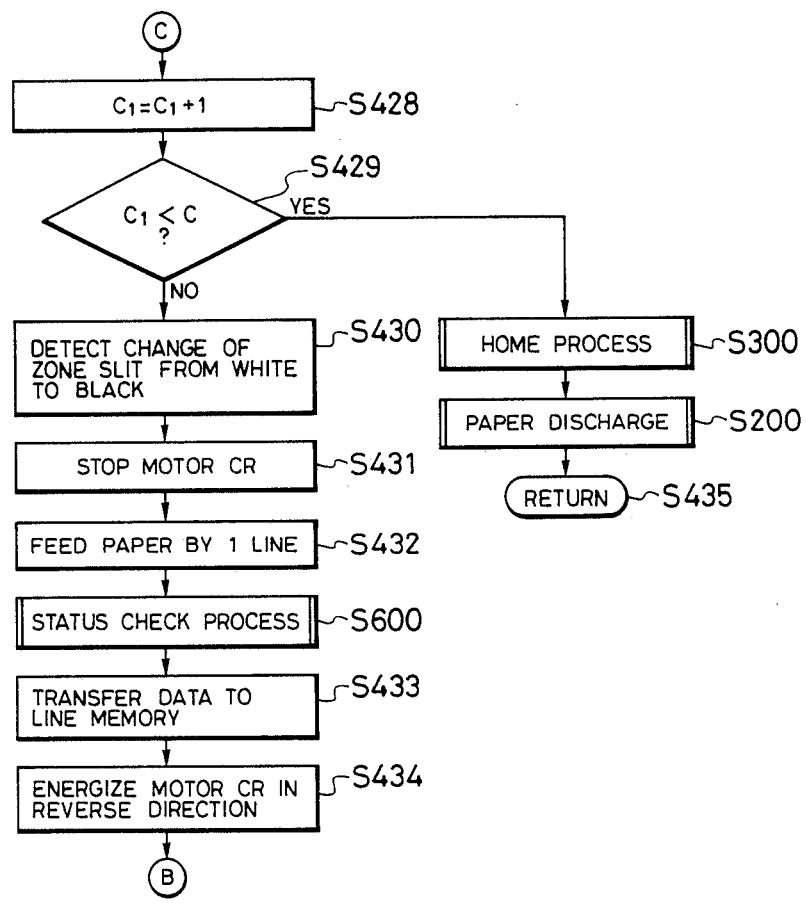

FIGS. 21E to 21G are flow charts of the printing process. The printing process consists of a status check process before paper feed, a paper feed process, a printing process, and a discharge process.

If depression of the printing switch 8 is detected in step S118, the print LED 8a is turned on in step S401 to inform the printing operation. In step S600, the following status check process is executed as inspection before the printing operation is started.

(Status Check Process)

Figure 21H:
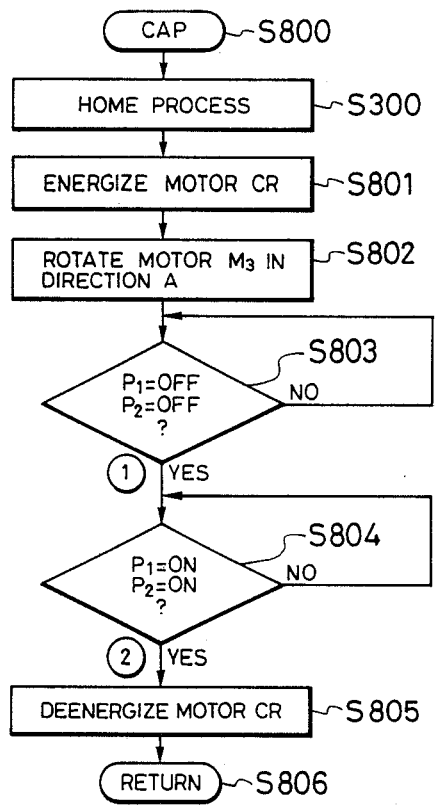
FIG. 21H is a flow chart of a capping process.
Figure 21I:
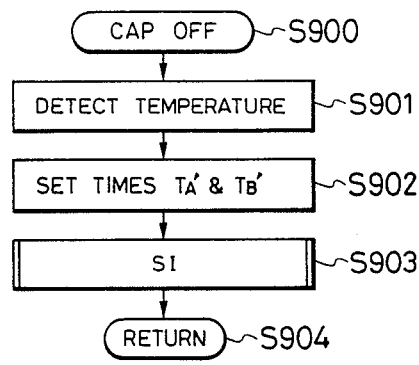
FIG. 21I is a flow chart of a cap-off process.
Figure 21J:
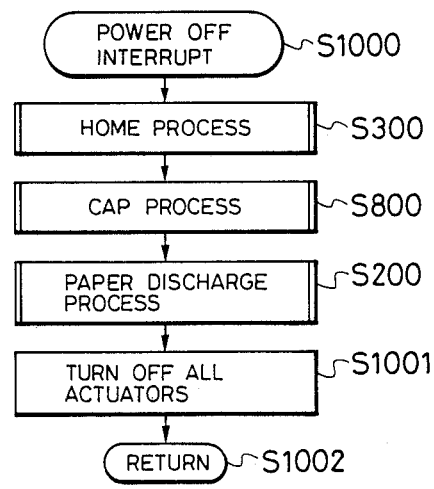
FIG. 21J is a flow chart of an interrupt operation when a power supply is OFF.
Figure 21K:
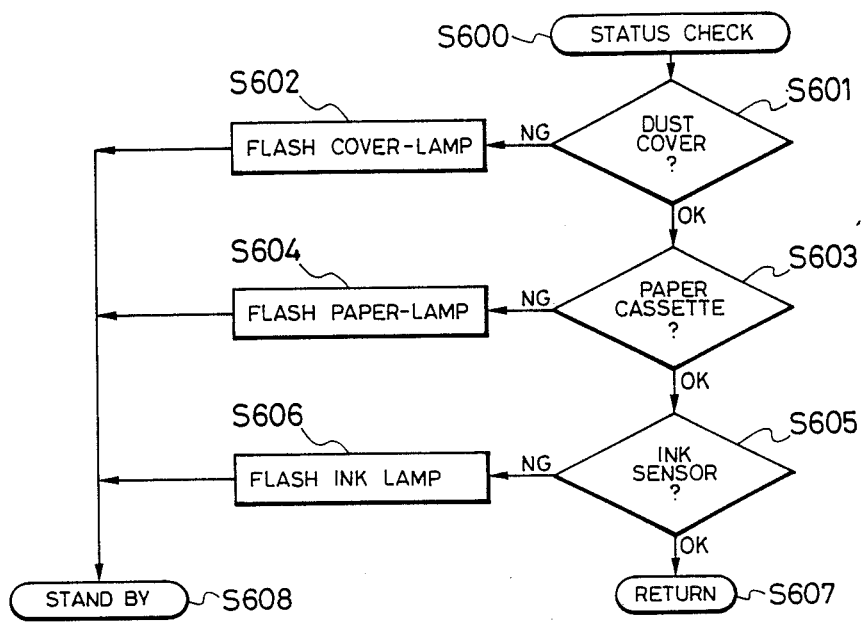
FIG. 21K is a flow chart of a status check process.

FIG. 21K is a flow chart of the status check process. In step S601, the dust cover sensor SW1 is checked. If the dust cover 4 is closed (SW1=ON), the LED 7a is flickered in step 602 to inform the abnormality of the paper feed system since the dust cover 4 interferes the paper discharge operation. The flow then advances to step S608, and the apparatus is set in the standby state. The standby state is canceled when the operator opens the dust cover 4. This also applies to the following processes. In step S603, the cassettes sensors SW4 and SW5 are checked. If no cassette is loaded (SW4=OFF and SW5=OFF), the LED 7a is flickered to inform the abnormality of the paper feed system in step S604. Then, the apparatus is set in the standby state.

In step S605, the ink cartridge sensor SW2 is checked. If no ink cartridge 10 is loaded (SW2=OFF), the LED 7b is flickered to inform the abnormality of the ink system, and the apparatus is set in the standby state. If no abnormality is found, the apparatus is normal, and the following paper feed process is executed.

Note that in the initialization process, although the OFF state of the paper sensor 24 (step S114) and the ON state of the home position sensor SW3 (step S115) necessary for starting the printing operation are achieved, since the abnormalities thereof must always be checked, these test steps may be included in the status check process.

(Paper Feed Process)

FIG. 21C is a flow chart of the paper feed process. The paper feed process consists of the separation process for separating an uppermost sheet $P_1$ from the cassette 2, and a convey process for feeding the separated sheet to the platen roller 22.

(1) Separation Process

In the separation process, the uppermost sheet $P_1$ in the cassette 2 is picked up and separated in a reverse direction (opposite to the convey direction). In steps S701 and S702, the pulse motor (paper feed motor) M2 is rotated in the reverse direction until the paper feed rollers reach an initial position $\alpha_0$ in FIG. 10A (SW6=ON). With this operation, the paper feed rollers 18 which have been slightly rotated toward the convey direction are returned to the initial position $\alpha_0$.

If the initial position $\alpha_0$ is detected in step S701, the pulse motor M2 is further rotated in the reverse direction by an $N_3$ step in step S703. Thus, the cam portions 18b formed of a resin having a relatively small frictional force of the paper feed (semilunar) rollers 18 begin to be in contact with the uppermost sheet $P_1$. If the number of stacked sheets is changed, the paper feed rollers 18 always maintain a constant level with respect to the uppermost sheet $P_1$. Therefore, an angle at which the cam portions 18b of the rotating paper feed rollers 18 are brought into contact with the uppermost sheet $P_1$ always becomes constant.

In this case, assuming that a frictional force between the uppermost sheet $P_1$ and the second sheet $P_2$ is given as $\mu_2$, a frictional force $\mu_1$ between the cam portions 18b and the uppermost sheet $P_1$ is set to have the following relationship with the frictional force $\mu_2$:

$$\mu_1 < \mu_2$$

For this reason, when the paper feed rollers further rotated, the stacked sheets P and the inner plate 14 are pressed downward against the biasing force of the coil spring 33b upon operation of the cam portions 18b.

Along with the downward movement of the stacked sheets P, the separation levers 15 are disengaged from the guides 1, and the separation plates 16 abut against the upper portion of the trailing end of the uppermost sheet $P_1$ by their own weight accompanying moments. Since the separation levers 15 are disengaged from the guides 17, the biasing force of the coil spring 33b serves to press the uppermost sheet $P_1$ against the cam portions 18b of the paper feed rollers 18. In this case, as will be described later, a pressing force for causing the rubber portions 18a of the paper feed rollers 18 to feed the uppermost sheet $P_1$ forward/backward is obtained.

When the paper feed rollers 18 are further rotated, the rubber portions 18a having a relatively large frictional force of the paper feed rollers 18 begin to abut against the uppermost sheet $P_1$. In this case, if a frictional force between the rubber portions 18a and the uppermost sheet $P_1$ is given as $\mu_3$, the following relationship is established between the frictional force $\mu_3$ and the frictional force $\mu_2$ between the uppermost sheet $P_1$ and the second sheet $P_2$:

$$\mu_2 < \mu_3$$

The uppermost sheet $P_1$ is slidably moved backward (in a direction opposite to the convey direction) upon rotation of the rubber portions 18a, and the trailing end portion of the uppermost sheet $P_1$ is fed toward the gap t between the separation portions 15d and 16a.

The separation portion 15a has an angle $\theta$ with respect to the moving direction of the sheet P, as shown in FIG. 6A. Thus, the trailing end portion of the uppermost sheet $P_1$ can be guided along the separation portion 16a toward the gap t. The separation portion 15d also has an angle $\theta$, and hence, the gap t can be maintained constant.

Figure 10A:
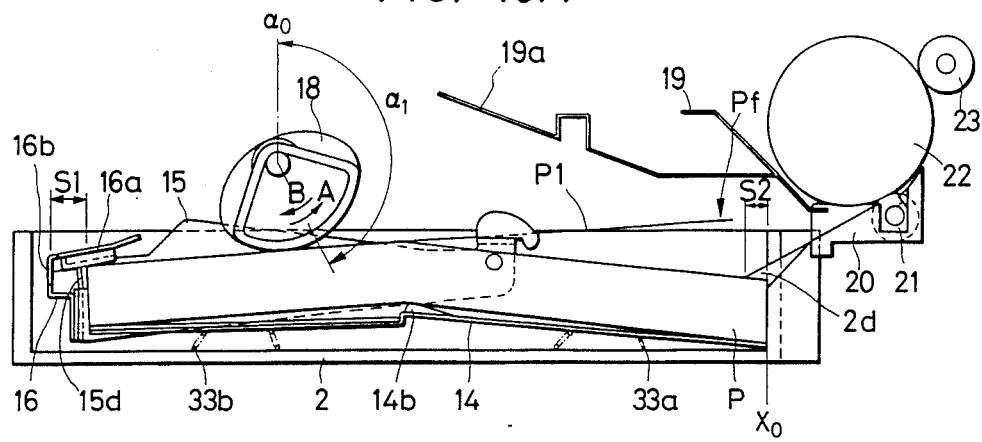
FIG. 10A is a side sectional view showing a state of sheet separation by a paper feed roller.

While the trailing end portion of the uppermost sheet $P_1$ is guided toward the gap t, its leading end portion is pulled out from the front press 2d, and as shown in FIG. 10A, the first half portion of the uppermost sheet $P_1$ is lifted upon operation of the bending step and the projection 14b of the inner plate 14. Thus, the uppermost sheet $P_1$ can be completely separated from the second sheet $P_2$. In this case, if the pressing force of the coil spring 33a against the front press 2d is too small, a sheet other than the uppermost sheet $P_1$ (in particular, the second sheet) is also pulled out from the front press 2d. Contrary to this, if the force is too large, a shortage of a pulling force of the rubber portions 18a is caused, and the sheet cannot be separated. Therefore, the biasing force of the coil spring 33a is determined in consideration of the pressing force of the sheet P against the front press 2d.

A feed amount $N_3$ of the pulse motor M2 is determined in consideration of the following respects. That is, if a distance from when the trailing end portion of the uppermost sheet $P_1$ passes through the gap t and until it abuts against the abutting portions 16b of the separation plates 16 (separation amount) is given by $S_1$, the following relationship is set between the amount $S_1$ and a size $S_2$ of the front press 2d:

$$S_1 > S_2$$

In this manner, when the backward movement of the trailing end portion of the uppermost sheet $p_1$ is regulated by the abutting portions 16, the leading end portion of the uppermost sheet $P_1$ can be reliably pulled out from the front press 2d.

Therefore, the rotational angle $\alpha_1$ of the paper feed rollers 18 in step S703, i.e., the feed amount $N_3$ step of the pulse motor, is determined in consideration of the separation amount $S_1$. Since the cam portions 18b of the paper feed rollers 18 abut against the uppermost sheet $P_1$ at the constant angle, as described above, a paper feed amount added to the angle during separation can be constant. Therefore, the total feed amount $N_3$ step of the pulse motor M2 can be made constant. Thus, simple control and a simple arrangement can be facilitated. Note that the value $N_3$ is set to be slightly larger in consideration of a margin under various circumstances.

(2) Convey Process

In the convey process, the separated uppermost sheet $P_1$ is fed in a forward direction (convey direction). In steps S704 and S705, the pulse motor M2 is rotated in a forward direction (A direction of the rollers 18) until the paper feed rollers 18 reach the initial position $\alpha_0$. Thus, the paper feed rollers 18 are rotated through the rotational angle $\alpha_1$, and are returned to the initial position $\alpha_0$. The rubber portions 18a are operated in a manner opposite to the separation operation to convey the leading end portion of the uppermost sheet $P_1$ to a paper initial position $X_0$ above the front press 2d.

In this state, since the trailing end portion of the uppermost sheet $P_1$ has passed through the gap t, a load when the uppermost sheet $P_1$ passes through the gap and a damage due to contact with the gap can be prevented in the following convey operation, thus allowing a stable convey operation. In particular, when a thick sheet (e.g., a thickness of about 0.25 mm) is used, variations in load during printing largely influence printing precision. Therefore, this embodiment free from the load after separation is very effective.

Figure 10B:
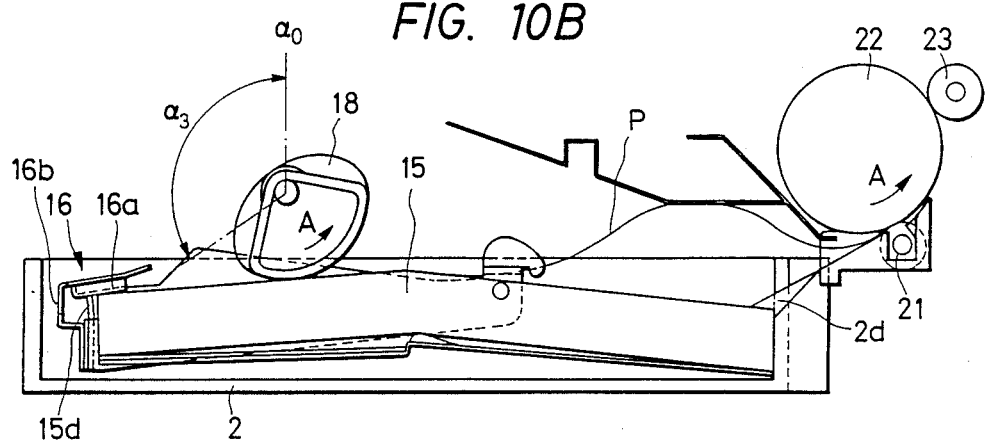
FIG. 10B is a side sectional view showing a state of a separated sheet to be conveyed to a rolling contact portion between a platen roller and register rollers.
Figure 10C:
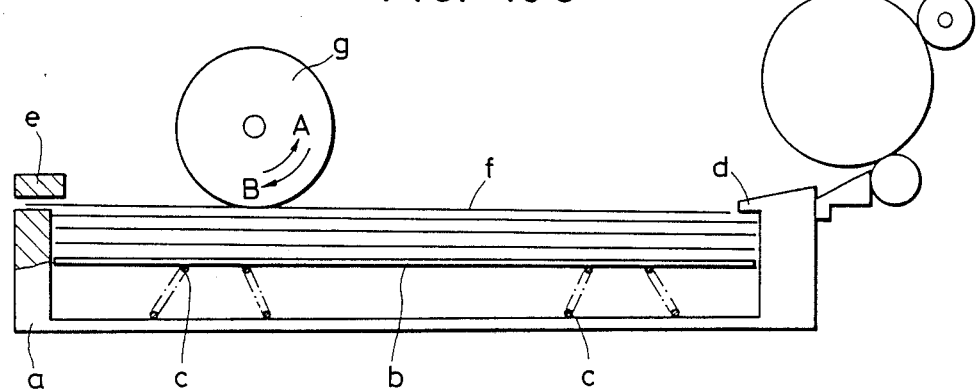
FIG. 10C is a side view showing a conventional positional relationship among a paper feed roller, a platen roller, and register rollers.

Since the initial position $\alpha_0$ is detected in step S704, the pulse motor M2 is further rotated by an $N_4$ step in a forward direction. The paper feed rollers 18 are rotated by a rotational angle $\alpha$ (not shown) in the A direction from the initial position $\alpha_0$. The separated uppermost sheet $P_1$ is fed toward the platen roller 22 by the convey force of the rubber portions 18a against which the sheet abuts. The leading end portion of the separated sheet P abuts against the outer peripheral surface of the platen roller 22 along the paper guides 19 and 20. When the paper feed rollers 18 are further rotated, a loop is formed in the separated sheet below the paper guide 19, as shown in FIG. 10B.

When the paper feed rollers 18 are further rotated, the loop is grown and abuts against the flat portion 19a of the paper guide 19. Thus, a convey force by a spring force based on the loop is generated in the separated sheet, and the leading end portion of the sheet can reliably abut against the rolling contact portion between the register rollers 21 and the platen roller 22. In this manner, skew of the separated sheet is corrected, and the paper feed rollers 18 are temporarily stopped at an angle $\alpha_3$. In this manner, even if the sheet is slightly curled, the sheet can reliably reach the rolling contact portion between the register rollers 21 and the platen roller 22 by the propelling force based on the spring force of the sheet itself.

In step S707, the pulse motor (paper feed motor) M1 is rotated by an $X_1$ step in the convey direction. Thus, the platen roller 22 is slightly rotated in a direction indicated by an arrow A in FIG. 10B, so that the leading end portion of the sheet P is gripped at the rolling contact portion between the platen roller 22 and the register rollers 21.

In steps S708 and S709, the pulse motor M2 is rotated in the convey direction until the paper feed rollers 18 have reached the initial position $\alpha_0$. The paper feed rollers 18 are completely separated from the separated sheet P, and releases the second half of the separated sheet P.

In step S710, the pulse motor M2 is rotated by an $N_5$ step in the reverse direction. Thus, the paper feed rollers 18 shown in FIG. 18 are rotated from the initial position $\alpha_0$ by an angle $\alpha_4$ in a direction indicated by an arrow B, and the pulley 18d coaxial with the paper feed rollers 18 and the pulley 25 which is 1:1 coupled thereto through the toothed belt 36 are rotated through the angle $\alpha_4$. The pin 25a integrally formed on the pulley 25 pushes out the cam portion 27b of the movable paper guide 27. The paper guide 27 begins to pivot in a direction indicated by the arrow B in FIG. 8 against the biasing force of the return spring 37. The distal end portion of the paper guide 27 is lowered to a position indicated by symbol D for forming a guide portion of the separated sheet P.

In steps S711 and S712, the pulse motor M1 is rotated in the convey direction until the paper sensor 24 is turned on. The paper sensor 24 detects the leading end portion of the separated sheet P slightly advanced from the register rollers 21, and can reliably guide the leading end portion of the separated sheet P toward the paper guide portion.

If it is detected in step S711 that the paper sensor 24 is ON, the pulse motor M1 is rotated by an $X_2$ step in the convey direction in step S713. Thus, the platen roller 22 is rotated in the direction indicated by the arrow A to convey the separated sheet P through the paper guide portion constituted by the press spring 34 and the movable paper guide 27. Thus, the leading end portion of the sheet P is inserted in the rolling contact portion between the platen roller 22 and the upper pinch rollers 23. In this case, since the movable paper guide 27 is formed coaxially with the platen roller 22, this gap can be designed to be small, and the gap of the paper guide portion can be made constant.

In this manner, when the sheet P is gripped between the platen roller 22 and the pinch rollers 23, the sheet P does not float from the platen roller 22. In step S714 and S715, the pulse motor M2 is rotated in the convey direction until the paper feed rollers 18 reach the initial position $\alpha_0$.

If the initial position of the paper feed rollers 18 is detected in step S714, the pulse motor M2 is rotated by an $N_6$ step in the forward direction in step S716. Thus, the paper feed rollers 18 are further rotated through an angle $\alpha_4$, and release the pin 25a of the pulley 25 from the cam portion 27a of the movable paper guide 27. In addition, the rollers 18 cause the movable paper guide 27 to retract to a position indicated by symbol C in the direction indicated by the arrow A in FIG. 8 by the biasing force of the spring 37, thus allowing a printing operation.

(Printing Process)

FIGS. 21E and 21F are flow charts of the printing process. The print mode includes three modes. When the paper size is large, the large-size mode is uniquely determined, and when the paper size is small, the normal mode or post card mode can be selected upon operation of the sub operation (mode) switch 12a before operation of the printing switch 8.

In step S402, the paper sensor 24 is checked. If no sheet is wound around the platen roller 22 in the above-mentioned paper feed process, the paper sensor is kept off or the paper feed fails. Thus, the LED 7a is flickered to inform the abnormality of the paper feed system, and the apparatus is set in the standby state in step S404. If a sheet is wound around the platen roller 22, since the paper sensor 24 is kept ON, the paper feed operation is successful. Furthermore, the cassette size is checked in step S405. If the large size is selected, the pulse motor M1 is empty-fed by an $X_{31}$ step for forming a margin.

In step S408, data "840" is set in a dot-count register L in the carriage scanning direction, and in step S409, data "1120" is set in a line-count register C in the paper feed direction. If the small size is selected, the size switch is checked in step S406. If the normal size is selected, the pulse motor M1 is idled by an $X_{32}$ step in step S410. Furthermore, data "435" is set in the dot-count register L in step S411, and data "580" is set in the line-count register C in step S412.

If the post-card size is selected, the pulse motor M1 is empty-fed by an $X_{33}$ step in step S413. Furthermore, data "435" is set in the dot-count register L, and data "580" is set in the line-count register C in step S415. In step S416, the dot counter $L_1$ and the line counter $C_1$ are initialized to "0". In step S417, one-line image data is transferred to the line memory 904. In step S418, the linear motor (CR motor) for the carriage 201 is driven in a direction indicated by an arrow I in FIG. 17, thus starting a printing operation.

(1) One-point Printing Process

FIG. 21F is a flow chart of a one-point printing process. If a change from black (dark) to white (light) of the zone slit 204b (in the case of reverse scanning, the zone slit 204b') is detected in step S419, this means that the carriage 201 is located at the start position of the print zone, and in step S420, data "0" is set in the dot counter $L_1$. If the large-size mode is detected in step S421, the flow advances to step S424 to immediately start detection of a change from black to white of the timing slit 204a. If the change is detected, the dot counter $L_1$ is incremented by +1 in step S425. In step S426, the contents of the dot counter $L_1$ and the dot-count register L are compared with each other, and if $L_1 < L$, the flow advances to step S427, and a one-point printing operation is performed. Then, the detection of the next timing slit 204a is performed. However, unless $L_1 < L$ in step S426, the one-line printing operation is completed, and the next line feed operation is performed.

Note that if the large-size mode is not detected in step S421, the flow advances to step S422 or S423 to await for detection of a change from white to black of the zone slit 204b (in the case of reverse scanning, the zone slit 204b'). Thus, a detection start timing of the timing slit 204a in step S424 is delayed to change a print zone.

(2) Line Feed Process

FIG. 21G is a flow chart of a line feed process.

In step S428, the content of the line counter $C_1$ is incremented by +1. In step S429, the content of the line counter $C_1$ and the content of the line-count register C are compared with each other, and if $C_1 < C$, detection of a change from white to black of the zone slit 204b'(in the case of the reverse scanning, the zone slit 204b) is awaited in step S430. If the change is detected, this means the carriage 201 is located at the end position of the line scanning, and in step S431, the CR motor is stopped.

In step S432, pulses corresponding in number to one line are supplied to the pulse motor M1, and the platen roller 22 is driven in the convey direction to feed the sheet by one line. In step S600, status check is performed for precaution. In step S433, next image data for one line is transferred to the line memory 904. In step S434, in order to perform bidirectional scanning, the drive direction of the CR motor is reversed, and the flow returns to step S419. Unless $C_1 < C$ in step S429, the one-page printing operation is completed, and the carriage 201 is returned to the home position by the home process S300 (to be described later). In the paper discharge process step S200, a sheet is discharged.

(Paper Discharge Process)

FIG. 21D is a flow chart of the paper discharge process.

In steps S201 and S202, the pulse motor M1 is rotated until the output rom the paper sensor 24 becomes OFF (no paper), so that the sheet P is fed until the trailing end portion of the sheet P wound around the platen roller 22 has passed by the paper sensor 24 portion. When the output from the paper sensor 24 is OFF, the flow advances to step S203, and the pulse motor M1 is further advanced by the $X_4$ step in the convey direction to further rotate the platen roller 22 in the convey direction.

The trailing end portion of the sheet P can be reliably discharged from a gap between the pinch roller 23 and the platen roller 22. In step S204, the pulse motor M1 is rotated by the $X_5$ step in the reverse direction, and the gear 43 in FIG. 9 is rotated in the direction indicated by the arrow B. Thus, the base plate 42 is pivoted in the direction indicated by the arrow B, and hence, the discharge rollers 28 which rotatably contact the pivoting end of the base plate 42 is rotated in the direction indicated by the arrow B. In this case, the sheet P has already been fed between the discharge rollers 29 and 28. Therefore, the sheet P is urged between the discharge rollers 28 and 29 by the rotating force of the base plate 42, and is discharged upon rotation of the discharge rollers 28.

Although not shown, when the output from the paper sensor 24 is OFF from the beginning of the paper discharge operation, rotation control until the output from the paper sensor 24 is OFF is omitted, and the pulse motor M1 is immediately rotated by the $X_4$ step in the convey direction. The base plate 42 is pivoted in the direction indicated by the arrow A, and the lower discharge rollers 28 are separated downward from the upper discharge rollers 29 to stand by below the paper guide 26. In this manner, the passage of the leading end portion of the sheet P is not interrupted. Therefore, the leading end portion of the sheet P is guided toward the paper guides 30 and 26b by the movable paper guide 27, and is fed between the pairs of the discharge rollers 28 and 29.

(Carriage Operation)

Figure 19:
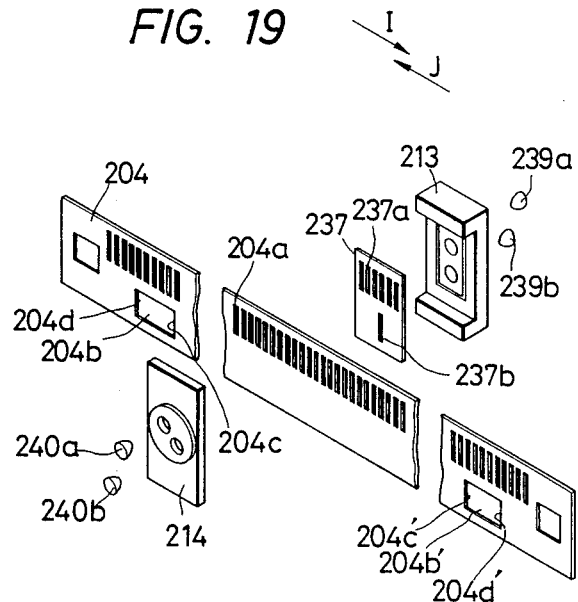
FIG. 19 is a perspective view showing an arrangement of a ribbon in the carriage moving system.

FIG. 17 shows an outer appearance of the carriage mechanism, and FIG. 19 shows an encoder for the carriage 201.

When no printing operation is performed, the carriage 201 stands by at the home position. When a print signal is input, the carriage 201 is energized in a direction indicated by an arrow I in FIG. 17. Thus, light emitted from the light emitting element 240a is ON-/OFF by the timing slits 204a to output an ON/OFF signal to the light receiving element 239a. The CPU 911 controls a current supplied to the coil 211 on a carriage board 216, thus scanning the carriage 201 at a constant speed. Furthermore, the ON or OFF element of the ON/OFF signal corresponds to one dot of a pixel, and timing control of the ink-jet head IJU for ejecting one point of ink is also performed.

Light emitted from the light emitting element 240b fixed to the carriage 201 is ON/OFF by the zone slits 204b and 204b' and the light receiving slits 237b, and the output from the light receiving element 239b are ON-/OFF by edges 204c, 204c', 204d, and 204d' of the zone slits 204b and 204b'. Therefore, after the printing operation is started, the carriage 201 is first moved in the direction indicated by the arrow I.

After the edge 204d of the zone slits 204b and 204b' is detected in the large-size print mode or after the edge 204c is detected in the small-size print mode, head drive pulses corresponding to image data are supplied to the piezoelectric element 222 on the nozzle 221 through the flexible circuit 215 by means of the ON/OFF signals of the light receiving element 239a corresponding to the predetermined number of points. In this manner, a point of ink is ejected to print a dot.

After the edge 204d' is detected, the carriage 201 is reversed, and travels in a direction indicated by an arrow J. After the edge 204d' is detected when the large-size cassette 2 is used or after the edge 204c' is detected when the small-size cassette 2 is used, the printing operation is started. After the predetermined printing operation is completed, the edge 204d is detected to reverse the carriage 201. The above reciprocal operation is repeated a number of times necessary for forming one image. Thereafter, the carriage 201 is returned to the home position, and is stopped when the home position sensor SW3 is turned on.

(Operation of Restoration System)

When a color omission is found in a resultant print due to abnormality such as clogging of the orifices 221a of the nozzles 221, the restoration system must be operated. FIG. 12 is a sectional view of a mechanism portion of the restoration system, FIG. 14 is a front view of a pump substrate for generating a control signal for the restoration system, and FIG. 15 is a timing chart of control signals $SWP_1$ and $SWP_2$ for the restoration system.

Figure 15:
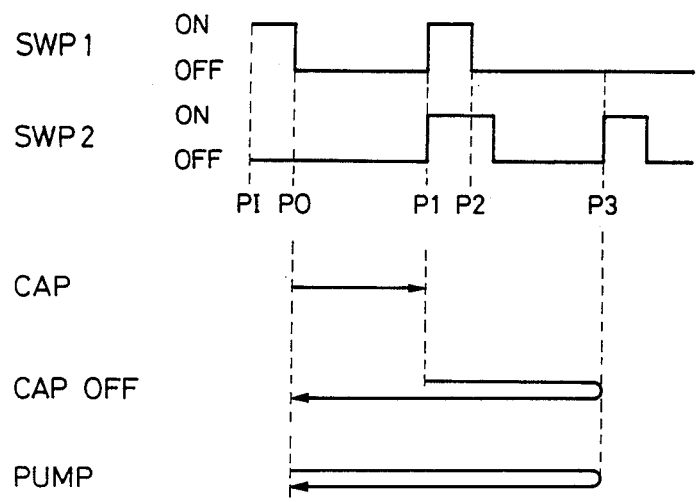
FIG. 15 is a timing chart of a pair of control signals $SWP_1$ and $SWP_2$ for the restoration system.

The control signals $SWP_1$ and $SWP_2$ shown in FIG. 15 are obtained when the contact member 141 shown in FIG. 14 is rotated from the standby position P0 on the pump substrate 109 toward the third operating position P3 in a direction indicated by an arrow C. FIG. 16A shows movement of the cams 108a and 108b when the contact member 141 is located at the first operating position P1, and FIG. 16B shows movement of the cams 108a and 108b when the contact member 141 is located at the second operating position P2. Similarly, FIG. 16C shows movement of the cams 108a and 108b when the contact member 141 is located at the third operating position P3.

(Restoration Process)

FIG. 21B is a flow chart of the restoration process for restoring clogging of the nozzles 221 or the like. In the standby process in FIG. 21A, when the operator depresses the pump button, the restoration process S500 is effected. The restoration process consists of a cap process for capping the cap 104 to the nozzles 221, a pump process for drawing ink in the nozzles 221 by a predetermined amount, and an uncap process for uncapping the cap 104 from the nozzles 221.

(Cap Process)

FIG. 21H is a flow chart of the cap process. In step S300, the home process S300 (to be described later) is executed to return the carriage 201 to the home position. In step S801, the CR motor is reenergized at the home position. Since the CR motor comprises the linear motor, if the linear motor is deenergized, the carriage 201 is fixed in position depending only on the bearing frictional force. For this reason, if the carriage 201 is pulled by a tube or the like, it is separated from the home position. The CR motor is reenergized until the cap operation is completed to urge the carriage 201 against a damper side, thus fixing the carriage in position.

In step S802, the motor M3 is rotated in a forward direction, and in step S803, $SWP_1$=OFF and $SWP_2$=OFF are established when the cams are moved from the standby position P0 to the initial position P.I. In step S804, the cams have reached the first operating position P1 and await for $SWP_1$=ON and $SWP_2$=ON. When the above relations are satisfied, the motor M3 is stopped in step S805. During this interval, the cam 108 is rotated from the state shown in FIG. 12 to the state shown in FIG. 16A. The second cam surface 108b pushes the cap lever 110 toward the ink-jet head IJU using the pump base portion 102 as a guide.

Furthermore, the cap lever 110 gradually pushes the cap holder 105 toward the ink-jet head IJU through the spring 111 against the biasing force of the return spring 112, and the cap 104 abuts against the front plate of the ink-jet head IJU. Since the cap lever 110 is further pressed, the spring 111 is charged, and the cap 104 made of, e.g., rubber is also charged by the biasing force of the spring 111, thus tightly closing the orifices. During this interval, since the cap lock lever 140 is biased by the coil spring 139 in the direction indicated by the arrow B, the locking end 140a of the cap lock lever 140 is rotated in the same manner as the second cam 108b while abutting against the stopper portion 108d of the cam 108. In this manner, the locking end 140a abuts against the slide guide 102e of the pump base 102 in the state shown in FIG. 16C, thus locking the cap lever 110. With the above operation, the cap operation is completed, and the ink-jet head IJU is fixed in position. In step S805, the carriage 201 is deenergized.

(Pump Process)

Steps S501 to S520 in FIG. 21B are a flow chart of the pump process.

In step S501, the temperature near the ink-jet head body 219 is detected by the temperature sensor 226, and in step S502, standby times $T_A$ and $T_B$ are determined in accordance with the detected temperature. Note that since the ink is a liquid, its viscosity is changed depending on temperatures. Therefore, if an ink suction time for restoring the nozzles 221 is fixed, the viscosity of the ink is decreased when the ink temperature is low, and the ink overflows. When the ink temperature is high, the viscosity is increased, and the ink cannot sufficiently flow.

The ink temperature in the sub tank 230 is detected so that the ink, an amount of which is necessary for restoration, can be drawn by suction. A predetermined table is looked up in accordance with the detected temperature to set optimal standby times $T_A$ and $T_B$. On the table, when the ink temperature is high, the time $T_A$ is short, and when the temperature is low, the time $T_A$ is long. Thus, the suction amount of ink can be made constant regardless of the temperature, and the ink necessary for restoring the nozzles 221 can be drawn by suction. As for the standby time $T_B$, if the temperature is low, the time $T_B$ is prolonged, and if high, it is shortened. Thus, the standby time $T_B$ is optimized so as not to again cause an ink nonejection state.

In step S510, the motor M3 is rotated in the forward direction until $SWP_1$=OFF and $SWP_2$=OFF. In step S511, the motor M3 is rotated until $SWP_1$=OFF and $SWP_2$=ON which indicate that the third operating position $P_3$ has been reached. The motor M3 is stopped in step S512. During this interval, the first and second cams 108a and 108b are moved from the state shown in FIG. 16B to the state shown in FIG. 16C, and the cam surface of the first cam 108a pushes down the piston 114 of the negative pressure generating mechanism against the biasing force of the spring 117.

In this state, since the valve of the valve mechanism connected on the upstream side of the cylinder 113 is closed, no ink flows into a space above the piston 114, and a negative pressure state is established. In this case, the ink which was drawn by suction by the pump in the previous pump process and stored in a space below the piston 114a portion is flowed from the discharge port 102d through the discharge tube 138 toward the discharged ink reservoir.

In step S513, the solenoid 130 of the valve mechanism is energized, and after the lapse of the standby time $T_A$ in step S514, the solenoid 130 is deenergized in step S515. FIG. 13 illustrates a state wherein the solenoid 130 is energized. When the solenoid 130 is energized, the planger 130a is attracted by a magnetic force, and the rotational lever 128 is rotated about the shaft 129 through the pin 135. Furthermore, the piston 137 is pulled downward through the pin 134. Thus, the rubber stop 125 closing the ink inlet port 124a is pulled downward to open the port 124a.

The negative pressure generated by the negative pressure generating source and transmitted to the valve case through the tube 137 is transmitted to the nozzles 221 through the ink tubes 122, and the ink in the nozzles 221 is drawn by suction. At the same time, bubbles clogged in the nozzles 221 are removed from the nozzles 221, thus restoring the nozzles 221. Since the solenoid 130 is used as a drive source for the valve mechanism, even if the power is OFF due to a power failure during the restoration operation, the valve is not closed, and color mixture in the nozzles 221 can be prevented.

In step S516, the pulse motor M3 is rotated in the reverse direction. In step S517, the motor M3 is rotated until $SWP_1$=OFF and $SWP_2$=OFF which indicate that the initial position P.I has been reached, and in step S518, the motor M3 is further rotated until SWP=ON and $SWP_2$=OFF indicating that the standby position P0 has been reached. If the above relations are satisfied, the motor M3 is stopped in step S519. During this interval, the first and second cams 108a and 108b are moved from the state shown in FIG. 16C to the state shown in FIG. 16B. The piston 114 is gradually moved upward by the biasing force of the spring 117 while being in contact with the cam surface of the first cam 108a, and is stopped when it abuts against the head portion of the cylinder 113. Therefore, at the position illustrated in FIG. 16B, the cam surface of the first cam 108a is not in contact with the piston 114, and is not influenced thereby. While the piston 114 is moved upward, the ink drawn upon operation of the valve mechanism is flowed below the body portion 114a of the piston 114 through the hole 114b of the piston.

Thereafter, the apparatus is left to stand for the standby time $T_B$ in step S520 for the following reason. That is, in the above restoration operation, the ink in the sub tank 230 is drawn by suction from the nozzles 221 and the discharge tube 122, and the interior of the sub tank 230 is set in the negative pressure state. Therefore, if the cap 104 is open in this state, air is drawn from the nozzles 221, and again causes clogging. For this reason, the apparatus is left to stand during the time $T_B$ until the ink is supplied from the main tank in the ink cartridge 10 to the sub tank 230, and the negative pressure in the sub tank 230 disappears.

(Uncap Process)

Step S521 and the subsequent steps are shown in a flow chart of the uncap process. In step S521, the CR motor is energized at the home position to generate a fixing force for the carriage 201. In step S522, the pulse motor M3 is rotated in the reverse direction. In step S523, it is awaited until $SWP_1$=OFF and $SWP_2$=OFF indicating that the standby position P0 is reached from the first operating position P1, and in step S524, it is awaited until $SWP_1$=ON and $SWP_2$=OFF indicating that the initial position P.I has been reached. When the above relations are satisfied, the pulse motor M3 is stopped in step S525. During this interval, the first and second cams 108a and 108b are moved from the state shown in FIG. 16B to the state shown in FIG. 12. The stopper portion 108d of the second cam 108b pushes up the cap lock lever 140 to release locking of the cap lever 110 by the cap lock lever 140, and the cap lever 110 is gradually moved backward along the cam surface of the second cam 108b. Meanwhile, the cap holder 105 is gradually pulled backward by the return spring 112, and the cap 104 opens the orifices 221a of the nozzles 221. Thus, the restoration operation is completed, and in step S526, the CR motor is deenergized.

(Home Process)

Figure 21L:
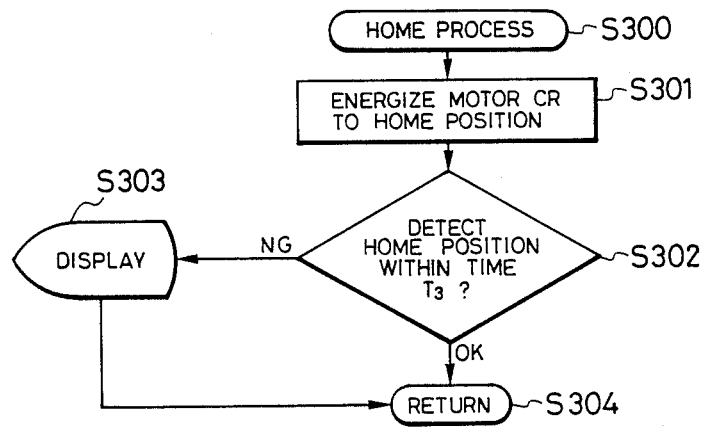
FIG. 21L is a flow chart of a home process.

FIG. 21L is a flow chart of the home process. In FIG. 17, a position of the restoration system facing the cap 104 corresponds to the home position of the head 219. In step S301, the CR motor is energized, so that the carriage 201 is driven toward the home position. It is checked in step S302 if the home position sensor SW3 is turned on within a predetermined time $T_3$. If the sensor SW3 is not turned on, this means that the movement of the carriage 201 is interfered. Therefore, a message indicating this is displayed in step S303. However, if the sensor SW3 is turned on, the CR motor is deenergized, and the flow returns.

(Cap-off Process)

FIG. 21I is a flow chart of the cap-off process.

Before the power switch 6 is turned on, the cap state is set. When the power switch 6 is turned on, the cap-off process is automatically executed. When the cap 104 abuts against the front plate and is charged during the cap operation while the power switch is OFF, since air is forcibly supplied in the distal ends of the nozzles 221, the air must be drawn by suction in the cap-off operation. In step S901, the ink temperature is detected in the same manner as in the pump process, and the standby times $T_A'$ and $T_B'$ are determined in accordance with the detected temperature. The standby times $T_A'$ and $T_B'$ are considerably shortened because air around the nozzles 221 is simply drawn by suction unlike in the pump operation.

SI executed in step S903 is the same as in step S510 and the subsequent steps in FIG. 21B. The first and second cams 108a and 108b begin to move from the state shown in FIG. 16A to push down the piston 114. Then, the first and second cams 108a and 108b reach the state shown in FIG. 16C to open the valve during the standby time $T_A'$, thereby drawing bubbles at the distal ends of the nozzles 221 by suction. Then, the pulse motor M3 is rotated in the reverse direction to move the first and second cams 108a and 108b to the state shown in FIG. 16B. The motor M3 is kept stopped during the standby time $T_B'$. Furthermore, the pulse motor M3 is driven to pivot the first and second cams 108a and 108b to the state shown in FIG. 12, thus completing the cap-off process.

(Power-off Process) FIG. 21I is a flow chart of the power-off process.

Normally, after the printing operation is completed or when the power switch 6 is turned off, the head 219 stands by at the home position. For this reason, in step S300, the home process is executed. In step S800, the cap process is executed. In step S200, the paper discharge process is executed to remove the remaining sheet P from the convey path. In step S1001, all the actuators are OFF.

What is claimed is:

1. A recording apparatus comprising:
   recording means for recording on a sheet at a recording position;
   sheet conveying means for conveying the sheet to the recording position;
   first driving means for driving said sheet conveying means;
   a sheet guiding member for guiding the sheet, said sheet guiding member being displaceable between a first position and a second position different from the first position; and
   second driving means for driving said sheet guiding member between the first position and the second position independently of the operation of said sheet conveying means.

2. An apparatus according to claim 1, wherein said sheet guiding member moves along a peripheral surface of said sheet conveying means.

3. An apparatus according to claim 1, wherein said sheet guiding member in the first position thereof is placed for guiding a sheet prior to recording and in the second position thereof is placed for guiding the sheet during recording.

4. A recording apparatus comprising:
   recording means for recording on a sheet at a recording position;
   sheet conveying means for conveying the sheet to the recording position;
   first driving means for driving said sheet conveying means;
   a sheet guiding member for guiding the sheet, said sheet guiding member being displaceable between a first position and a second position different from the first position;
   second driving means for driving said sheet guiding member between the first position and the second position independently of the operation of said sheet conveying means;
   detecting means disposed proximate to the recording position for detecting the presence and absence of the sheet; and
   control means for controlling said first driving means and said second driving means in response to said detecting means.

5. An apparatus according to claim 4, wherein said sheet guiding member moves along a peripheral surface of said sheet conveying means.

6. An apparatus according to claim 6, wherein said sheet guiding member in the first position thereof is placed for guiding a sheet prior to recording and in the second position is placed for guiding the sheet during recording.

7. A conveying apparatus for conveying a sheet to a recording position, comprising:
   sheet conveying means for conveying the sheet to the recording position;
   first driving means for driving said sheet conveying means;
   a sheet guiding member for guiding the sheet, said sheet guiding member being displaceable between a first position and a second position different from the first position; and
   second driving means for driving said sheet guiding member between the first position and the second position independently of the operation of said sheet conveying means.

8. An apparatus according to claim 7, wherein said sheet guiding member moves along a peripheral surface of said sheet conveying means.

9. An apparatus according to claim 7, wherein said sheet guiding member in the first position thereof is placed for guiding a sheet prior to recording and in the second position thereof is placed for guiding the sheet during recording.

10. A recording apparatus comprising:
    a recording means for recording on a sheet at a recording position;
    a platen at the recording position;
    platen driving means for rotating said platen to convey the sheet past the recording position;
    a sheet loading section for holding a sheet thereon prior to the feeding thereof to the recording position;

sheet feed means for feeding a sheet held by said sheet loading section to said platen;

a sheet guiding member for guiding of the sheet, said sheet guiding member being displaceable between a first position for guiding a sheet fed by said sheet feed member to the recording position prior to recording and a second position for guiding the sheet during recording by said recording means; and second driving means for driving said sheet guiding member between the first position and the second position independently of the operation of said platen driving means.

* * * * *

UNITED STATES PATENT AND TRADEMARK OFFICE
CERTIFICATE OF CORRECTION

PATENT NO. : 4,888,602
DATED : December 19, 1989
INVENTOR(S) : YOSHITAKA WATANABE, ET AL.

Page 1 of 5

It is certified that error appears in the above-identified patent and that said Letters Patent is hereby corrected as shown below:

SHEET 16 OF 26

FIG. 20, Block 923, "DISCHARG MOTOR" should read --DISCHARGE MOTOR--.

SHEET 17 OF 26

FIG. 21A, Block S107, "PINCHI-" should read --PINCH- --.

COLUMN 2

Line 49, "showing" should read --view--.

COLUMN 4

Line 68, "line" should read --lines--.

COLUMN 5

Line 10, "s shown" should read --as shown--.

COLUMN 6

Line 44, "plate 14 are" should be deleted.
Line 45, "biased upward by coil springs 33a and 33b," should be deleted.
Line 66, "ration portion 15e." should read --ration portion 15d.--.

UNITED STATES PATENT AND TRADEMARK OFFICE
CERTIFICATE OF CORRECTION

PATENT NO. : 4,888,602

DATED : December 19, 1989

INVENTOR(S) : YOSHITAKA WATANABE, ET AL.

It is certified that error appears in the above-identified patent and that said Letters Patent is hereby corrected as shown below:

COLUMN 7

Line 34, "down, if" should read --down. If-- and "sheet 14g" should read --sheet 14g,--.
    Line 35, "would receive" should read --the last sheet, i.e., the lowermost sheet would receive--.
    Line 36, "and" (first occurrence) should read --and would be--.
    Line 39, "suede" should read --suede)--.

COLUMN 10

Line 48, "a spring 37," should read --by a spring 37,--.

COLUMN 12

Line 8, "rotated friction" should read --rotated against the friction--.
    Line 63, "are" should read --is--.

COLUMN 14

Line 38, "124," should read --124a,--.
    Line 40, "holes 124." should read --holes 124a.--.
    Line 50, "piston 27" should read --piston 127--.
    Line 53, "plate 26" should read --plate 126--.
    Line 54, "rubber stop 25" should read --rubber stop 125--.

UNITED STATES PATENT AND TRADEMARK OFFICE
CERTIFICATE OF CORRECTION

PATENT NO. : 4,888,602
DATED : December 19, 1989
INVENTOR(S) : YOSHITAKA WATANABE, ET AL.

It is certified that error appears in the above-identified patent and that said Letters Patent is hereby corrected as shown below:

COLUMN 15

Line 54, "fixed" should read --fixed to--.

COLUMN 16

Line 21, "are" should read --is--.

COLUMN 18

Line 36, "the head housing 219" should read --the ink-jet head housing 219--.
    Line 39, "a connecting line portion 15a" should read --a connecting line portion 215a--.

COLUMN 20

Line 10, "portions 215a and 215." should read --portions 215a and 215b.--.

COLUMN 22

Line 16, "is" (third occurrence) should be deleted.

COLUMN 23

Line 14, "cassettes" should read --cassette--.

UNITED STATES PATENT AND TRADEMARK OFFICE
CERTIFICATE OF CORRECTION

PATENT NO. : 4,888,602

DATED : December 19, 1989

INVENTOR(S) : YOSHITAKA WATANABE, ET AL.

It is certified that error appears in the above-identified patent and that said Letters Patent is hereby corrected as shown below:

COLUMN 24

Line 1, "paper feed rollers" should read --paper feed rollers 18 are--.

COLUMN 25

Line 2, "sheet $p_1$" should read --sheet $P_1$--.

COLUMN 26

Line 12, "releases" should read --release--.

COLUMN 28

Line 37, "rom" should read --from--.
    Line 54, "is" should read --are--.

COLUMN 29

Line 30, "are" should read --is--.

COLUMN 32

Line 8, "SWP=ON" should read --$SWP_1$=ON--.

UNITED STATES PATENT AND TRADEMARK OFFICE
CERTIFICATE OF CORRECTION

PATENT NO. : 4,888,602
DATED : December 19, 1989
INVENTOR(S) : YOSHITAKA WATANABE, ET AL.

It is certified that error appears in the above-identified patent and that said Letters Patent is hereby corrected as shown below:

COLUMN 33

Line 15, "the power switch" should read
--the power switch 6--.
Line 42, "Process) FIG." should read
--Process) ¶ FIG.--.

COLUMN 34

Line 33, "claim 6," should read --claim 4,--.

Signed and Sealed this

Tenth Day of September, 1991

Attest:

HARRY F. MANBECK, JR.

Attesting Officer Commissioner of Patents and Trademarks